US008447231B2

(12) United States Patent
Bai et al.

(10) Patent No.: US 8,447,231 B2
(45) Date of Patent: May 21, 2013

(54) INTELLIGENT TELEMATICS INFORMATION DISSEMINATION USING DELEGATION, FETCH, AND SHARE ALGORITHMS

(75) Inventors: Fan Bai, Ann Arbor, MI (US); Donald K. Grimm, Utica, MI (US); Cem U. Saraydar, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 265 days.

(21) Appl. No.: 12/915,569

(22) Filed: Oct. 29, 2010

(65) Prior Publication Data

US 2012/0108163 A1     May 3, 2012

(51) Int. Cl.
*H04B 5/00*     (2006.01)

(52) U.S. Cl.
USPC ........ 455/41.1; 455/3.06; 455/41.2; 340/902; 340/904

(58) Field of Classification Search
USPC ................ 455/3.06, 41.1, 41.2; 340/902, 904
See application file for complete search history.

(56) References Cited

U.S. PATENT DOCUMENTS 8,072,349 B2 * 12/2011 Janke ............................ 340/902
2007/0111672 A1 * 5/2007 Saintoyant et al. ............. 455/73

* cited by examiner

*Primary Examiner* — Tuan H Nguyen
(74) *Attorney, Agent, or Firm* — Parks IP Law LLC; Mickki D. Murray

(57) ABSTRACT

A system for intelligent dissemination of messages via long-range communications to select delegate vehicles, and short-range communications from the delegate vehicles. The system includes a processor and a memory storing a delegation and dissemination algorithm that, when executed by the processor, causes the processor to define a dissemination area and define multiple delegation zones within the dissemination area. The algorithm also causes the processor to identify at least one delegate vehicle, of a network of vehicles, for each delegation zone and seed a message into the network of vehicles by transmitting the message to each delegate vehicle via long-range communications so that the delegate vehicles can transmit the message throughout the network of vehicles via short-range communications.

40 Claims, 10 Drawing Sheets

INTELLIGENT TELEMATICS INFORMATION DISSEMINATION USING DELEGATION, FETCH, AND SHARE ALGORITHMS

TECHNICAL FIELD

The present disclosure relates generally to systems and methods for disseminating information and, more particularly, to systems and methods for disseminating telematics information using delegation, fetch, and share algorithms.

BACKGROUND

Modern automobiles include an on-board computer controlling select vehicle functions and providing the vehicle and driver with various types of information. For example, on-board computers control select engine and suspension functions and facilitate communications with other vehicles and remote driver-assistance centers. For example, the OnStar® system, of the General Motors Corporation, provides services including in-vehicle safety and security, hands-free calling, turn-by-turn navigation, and remote-diagnostics systems.

On-board computers also facilitate delivery to the driver of information and entertainment (referred to collectively as infotainment), such news feeds, weather, sports, and notifications about vehicle location and nearby traffic. Messages transmitted to vehicles can also include new software for the on-board computer, or upgrades or updates to existing software.

Many conventional telematics communication systems transmit messages to on-board computers using only cellular telecommunication. That is, a remote server of the system establishes a wireless connection, over a cellular telecommunication network, with each vehicle for which it has information.

This traditional reliance on the cellular network has various drawbacks. For example, extensive use of the cellular network causes congestion and the cost of transmitting each message to every participating vehicle, or even to a subset of the vehicles, is relatively high.

SUMMARY

The present disclosure relates to a system for intelligent dissemination of messages via long-range communications to select delegate vehicles, and short-range communications from the delegate vehicles. The system includes a processor and a memory storing a delegation and dissemination algorithm that, when executed by the processor, causes the processor to define a dissemination area and define multiple delegation zones within the dissemination area. The algorithm also causes the processor to identify at least one delegate vehicle, of a network of vehicles, for each delegation zone and seed a message into the network of vehicles by transmitting the message to each delegate vehicle via long-range communications so that the delegate vehicles can transmit the message to the network of vehicles via short-range communications.

The present disclosure also relates to a method for intelligent dissemination of messages via a long-range communications to select delegate vehicles, and short-range communications from the delegate vehicles. The method includes a central server defining a dissemination area and the central server defining multiple delegation zones within the dissemination area. The method also includes the central server identifying at least one delegate vehicle, of a network of vehicles, for each delegation zone and the central server seeding a message into the network of vehicles by transmitting the message to each delegate vehicle via long-range communications so that the delegate vehicles can transmit the message to the network of vehicles via short-range communications.

Further, the present disclosure relates to a method for migrating delegation assignment from a first, delegate vehicle to a second, non-delegate vehicle in an intelligent system for disseminating messages via a long-range communications to select delegate vehicles, and via short-range communications from the delegate vehicles. The method includes comparing a Degree of Contacting for the first, delegate vehicle to a Degree of Contacting for the second, non-delegate vehicle, wherein the Degree of Contacting is a number of vehicles that a given vehicle can contact in one hop. The method also includes if the Degree of Contacting for the first, delegate vehicle is equal to or less than the Degree of Contacting for the second, non-delegate vehicle, comparing a Degree of Facilitating for the first, delegate vehicle to a Degree of Facilitating for the second, non-delegate vehicle, wherein the Degree of Facilitating is a number of vehicles that a given vehicle can contact in multiple hops. The method also includes if the Degree of Facilitating for the first, delegate vehicle is equal to or less than the Degree of Facilitating for the second, non-delegate vehicle, calculate a Degree of Similarity between the first, delegate vehicle and the second, non-delegate vehicle. The method also includes, if the Degree of Similarity is greater than a predetermined threshold, the first, delegate vehicle maintains its delegate role. If the Degree of Similarity is less than or equal to the predetermined threshold, the second vehicle assumes the delegate role previously held by the first vehicle.

In another aspect, the present invention relates to a method for intelligent dissemination of messages by way of via short-range communications and long-range communications to vehicles in a system also including a central server. The method includes determining whether at least one particular vehicle of the vehicles in the system has received a particular message by way of short-range communications from another one of the vehicles in the system. The method also includes determining whether a time-based trigger or a geographic-based trigger has occurred with respect to the particular vehicle of the system. Further, the method includes, in response to determining that the particular vehicle has not received the particular message by way of short-range communications from the other vehicles and determining that at least one of the time-based trigger and the geographic-based trigger has occurred, establishing a long-range communication between the particular vehicle and the central server. The method still further includes the central server providing the particular message to the particular vehicle by way of the established long-range communication.

In yet another aspect, the present invention relates to a method for increasing data diversity in an intelligent data dissemination system using short-range communications and long-range communications to vehicles in the system also including a central server. The method includes determining whether a data diversity index has exceeded a pre-determined threshold value. The method also includes providing new content to at least one of the vehicles in the system by way of long-range communication in response to determining that the data diversity index has been exceeded.

Other aspects of the present invention will be in part apparent and in part pointed out hereinafter.

DETAILED DESCRIPTION

Figure 1:
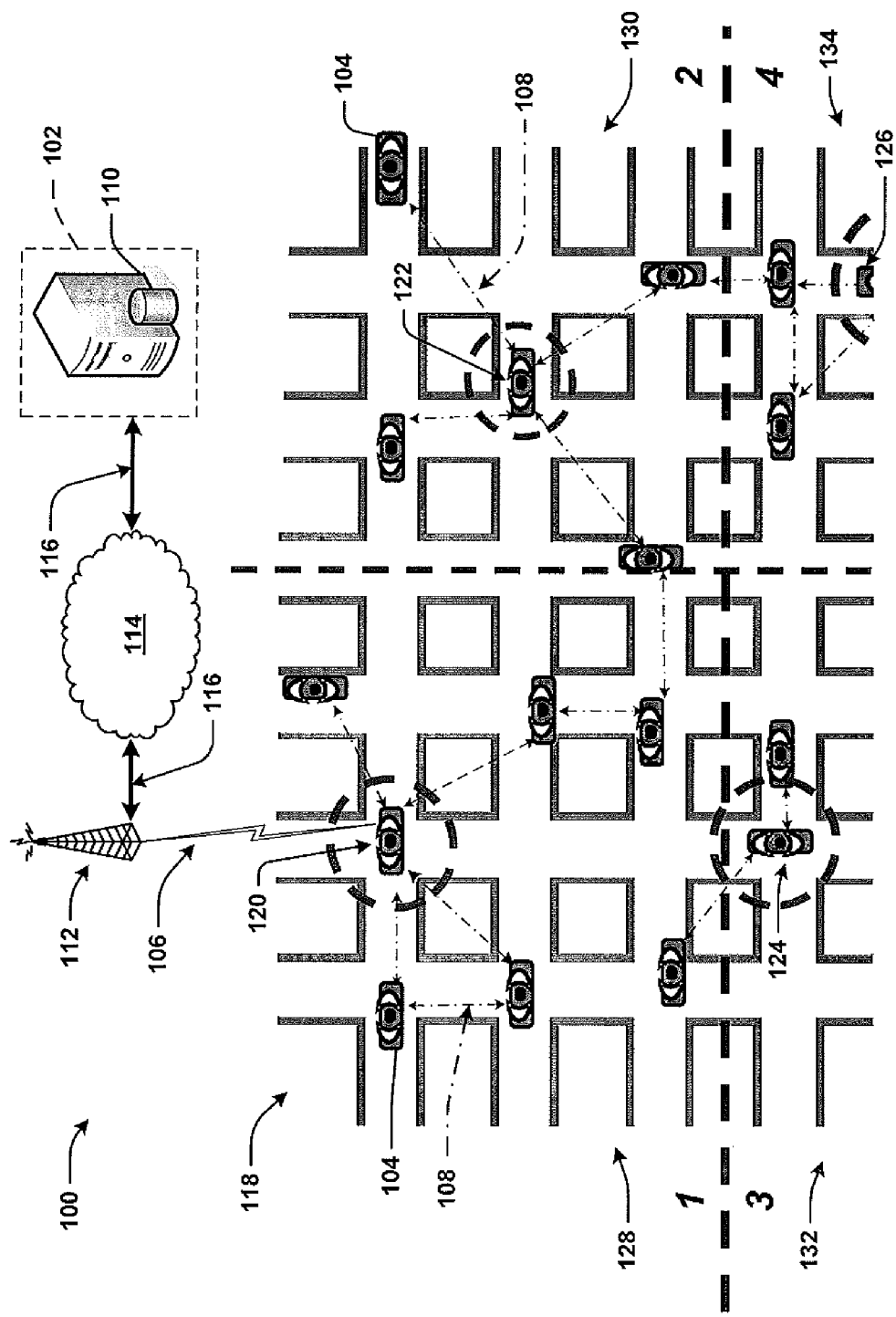
FIG. 1 illustrates a system for disseminating information from a remote sub-system to multiple dispersed vehicles by way of long-range communications to at least one selected delegate vehicle and then short-range communications between vehicles, according to an embodiment of the present disclosure.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The terms "application," "algorithm," "program," "instructions," or variants thereof, are used expansively herein to include routines, program modules, programs, components, data structures, algorithms, and the like, as commonly used. These structures can be implemented on various system configurations, including single-processor or multiprocessor systems, microprocessor-based electronics, combinations thereof, and the like. Although various algorithms, instructions, etc. are separately identified herein (e.g., delegation algorithm, dissemination algorithm, migration algorithm), various such structures may be separated or combined in various combinations across the various computing platforms described herein.

I. General Overview

The present disclosure describes systems, methods, and computer-readable media for disseminating information to vehicles. The nature of information disseminated is not limited, and may include a variety of types of telematics information, software for the on-board computer, upgrades or updates to existing software, data for storage, retrieval, and use by the on-board computer, and infotainment, including news or local traffic and weather conditions.

According to embodiments of the present disclosure, as described in detail below, delegation zones are identified and at least one delegate vehicle is selected for each zone. Information is transmitted to each selected delegate vehicle over a long-range communications network (e.g., a cellular telecommunication network) from a central dissemination server. The delegate vehicles, having received the transmitted message, proceed to disseminate the information to nearby vehicles, and perhaps other nearby nodes, using relatively short-range communications, such as Dedicated Short-Range Communications (DSRC). Although short-range communications are primarily disclosed herein with respect to vehicle-to-vehicle (V2V) communications, longer-range communications, such as what may be categorized as medium-range communications, may also be used with the embodiments of the present disclosure.

The techniques of the present disclosure may also be used in combination with vehicle-to-infrastructure (V2I), vehicle-to-pedestrian (V2P) or other vehicle-related (V2X) communications, including various types of ad hoc networks, such as cellular or other mobile ad hoc networks.

The present disclosure also describes, in addition to systems, methods, and computer-readable media for selecting at least one dissemination delegate vehicle, systems, methods, and computer-readable media for migrating a delegation from one vehicle to another, based upon multiple factors configured to identify which of the vehicles is a more-ideal vehicle for disseminating the subject information.

According to other embodiments of the present disclosure, fetch and share schemes are employed, which initiate fetching of content (e.g., infotainment data), in response to occurrence of circumstances such as (1) a specified period of time elapsing, (2) a particular geographic area or location having been entered, or (3) a determined desire for more data diversity within the network.

The technology of the present disclosure creates and makes efficient use of a multi-tier system including a long-range tier and a short-range tier. Efficiencies are accomplished in part by intelligent cross-tier communications, as described further herein.

Although the present invention is primarily described for illustration purposes with respect to V2V systems, wherein system nodes include automotive vehicles, the present disclosure can be used to improve dissemination of information to other types of nodes, such as pedestrians carrying mobile devices.

While certain functions of the present disclosure are described primarily as being performed by a certain acting entity for purposes of illustration, such as a central server, various functions of the present disclosure may be performed by one or any combination of entities selected from the central server, system operating personnel, and one or more of the on-board computer systems. For example, while selection of delegate vehicles is primarily described herein as being made by a central server, the on-board computers and/or a system operator may also actively participate in the selection process. And while consideration of a possible delegation migration is described primarily herein as being performed by one or both on-board computers of two vehicles (one being a delegate), the consideration may also be performed in part or completely by the central server and/or a system operator.

II. System Architecture

Turning now to the figures, and more particularly to the first figure, FIG. 1 illustrates a system 100 for disseminating information from a remote sub-system 102 to multiple dispersed vehicles 104 by way of long-range communications 106 and short-range communications 108 between vehicles 104. For ease of illustration, not every long-range communication 106 and short-range communication 108 is shown.

The remote sub-system 102 includes a central dissemination server 110 and may include a customer-service center, such as an OnStar® monitoring center. The central server 110 initiates information messages for delivery to the on-board computer of each vehicle 104 of the system 100, or a sub-set of the vehicles 104. The sub-set may include, for example, vehicles of a certain type (e.g., having a certain type of software or hardware package), vehicles in a certain geographical area, etc. The messages initiated by the central server 110 may include any of a variety of information, such as software upgrades or updates, instructions for vehicle users, news, traffic, weather, etc.

Although a single central server 110 is primarily described, it will be appreciated that the remote-subsystem 102 can include any number of computer servers, connected and/or independent, in the same and/or various geographic locations. Messages sent from the remote-subsystem 102 may be initiated by the server 110 (e.g., a periodic software update or a severe weather advisory received from the National Weather Service) or an operator of the system 100, such as personnel at the remote sub-system 102 (e.g., monitoring-center operator).

Each vehicle 104 includes an on-board computer (not shown in detail) having a processor, and a memory storing computer-readable instructions executable by the processor to perform various functions. Functions of the on-board computer include communication with the remote sub-system 102, communication with the on-board computers of other vehicles 104, vehicle control, emergency notifications and other presentation of information to the driver, and others.

At least some of the vehicle 104 must have hardware and programming for long-range communications, such as a cellular interface (not shown in detail). In one embodiment, it is from a pool of vehicles 104 equipped as such that the central server 110 identifies one or more seed, or delegate vehicles 120, 122, 124, 126 to which to seed a message for dissemination to all vehicles 104, or the select subset. Each participating vehicle 104 includes short-range communication hardware (interface, programming, etc.) for receiving and sending short-range communications, or at least receiving such communications.

With further reference to FIG. 1, the long-range communications 106 are sent to one or more selected delegate vehicles 120, 122, 124, 126. The long-range communications 106 may include, for example, cellular communications via one or more cellular base station transceivers 112, such as a base transceiver station (BTS) or node b. The long-range communications may also include a roadside transmitter or transceiver, or other transportation network infrastructure (not shown). Although transportation infrastructure components, such as roadside transceivers, are mentioned herein, in some embodiments it is preferred to avoid reliance on such infrastructure, thereby reducing the need and cost to implement the infrastructure components, or to ensure proper development, locating, maintenance, and implementation of the same.

The system 100 and messages may be configured so that the messages pass from the remote-subsystem 102 to the base station transceiver(s) 112 for transmission using any of a variety of intermediary networks 114, such as the Internet, and wireless and/or landline channels 116.

Each delegate vehicle 120, 122, 124, 126 receives the long-range communication 106 and, according to computer-readable instructions in its memory and/or in the message, propagates the message to other, nearby vehicles 104 via short-range communications 108. The vehicles 104 receiving the short-range messages may then further disseminate the messages by short-range communications. Selection of delegate vehicles 120, 122, 124, 126 and protocol for message dissemination are described further, below.

Short-range communications 108 may include one or more short-range communication protocols, such as DSRC, WI-FI®, BLUETOOTH®, infrared, infrared data association (IRDA), near field communications (NFC), the like, or improvements thereof (WI-FI is a registered trademark of WI-FI Alliance, of Austin, Tex.; and BLUETOOTH is a registered trademark of Bluetooth SIG, Inc., of Bellevue, Wash.).

III. Selection of Delegate Vehicles

In one embodiment of the present disclosure, the central server 110 selects the one or more delegate vehicles 120, 122, 124, 126 by executing a delegation computer algorithm based on geospatial relationships. In a particular embodiment, the delegation algorithm is stored in a memory of the central server 110.

In a particular embodiment, the delegation algorithm causes a processor of the central server 110 to identify an area 118 over which it is desired to disseminate a message. For example, the algorithm causes the central server 110 to arrange transmission of a message for dissemination to vehicles 104 located in a certain country, state, metropolitan area, or city, on a certain highway, portions of these, or other area or region.

The algorithm is further configured to obtain data identifying delegation zones 120, 122, 124, 126 into which the area 118 is divided, and to identify at least one delegate vehicle per identified delegation zone.

A. Delegation Zones

In some embodiments, the central server 110 automatically defines delegation zones 128, 130, 132, 134. The zones may be two-dimensional (2-D) or generally one-dimensional (1-D) in nature, as described further in the following paragraphs.

Delegation zones 128, 130, 132, 134 are in some embodiments dynamic, or depending on variables, and in some embodiments static, or preset. For example, based on historic travel and vehicle-concentration patterns, the central server 110 or personnel of the remote sub-system 102 may determine that a certain downtown area, or rural highway, should be divided into certain sized and shaped zones for all or certain types of disseminations going forward, without need to evaluate more of-the-moment data at the time of each delegation. It is noted that even with static zones, the server 110 or personnel can of course improve the static zones, such as based on performance of the system 100 and/or feedback over time and so they are not completely static in this way. Such improvements to a static zoning, or evaluation in contemplation of such improvements could be performed periodically, such as weekly, monthly, or quarterly. These embodiments, in which static zones are prescribed and regularly updated, can be referred to as hybrid zoning.

Variables for dynamically defining delegation zones 128, 130, 132, 134 include, in various embodiments, any of historic vehicle concentration within the dissemination area 118, present vehicle concentration within the dissemination area 118, size of the area, desired timing for disseminating the message to the vehicles 104 in the area 118, and others.

The delegation algorithm may be configured to cause the central sever 110 to define any number, size, and shape of delegation zones 128, 130, 132, 134. For instance, although four, generally rectangular, zones 128, 130, 132, 134 are shown in FIG. 1 (only a small portion of the third and fourth zones 132, 134 are shown) the area 118 may be divided into more or fewer zones, having any of a variety of shapes.

Exemplary shapes for the dissemination area 118 and delegation zones 128, 130, 132, 134 include pentagon, hexagon, other regular or irregular polygons, circle, oval, and nondescript shapes (shapes not being associated traditionally with a name). The boundaries of the dissemination area 118 and the delegation zones 128, 130, 132, 134 are in various embodiments described in any of a variety of ways, including by geographic coordinates (e.g., latitude and longitude) or global-positioning-system (GPS) coordinates.

In some scenarios, zones may be associated with a road, highway, or select stretches of the same. In these scenarios, the zone can be generally considered as being one-dimensional (1-D) For example, fifty miles of rural highway may be divided into five delegations zones of generally equal or different lengths.

B. Delegations

As introduced above, the central server 110 is in some embodiments configured to select at least one delegate vehicle 120, 122, 124, 126 per delegation zone 128, 130, 132, 134. For instance, the processor of the central server 110, executing the instructions stored in the memory of the central server 110, identifies one or more delegate vehicles 120, 122, 124, 126 per delegation zone 128, 130, 132, 134. In the embodiment shown in FIG. 1, the dissemination area 118 has been divided into at least four delegation zones 128, 130, 132, 134, and the central server 110 has identified one delegate vehicle 120, 122, 124, 126 per zone 128, 130, 132, 134.

In some implementations, an operator of the system 100, such as an operator of a monitoring center of the remote sub-system 102, selects at least one of the delegate vehicles 120, 122, 124, 126, with or without assistance from the central server 110.

Variables for selecting a delegate vehicle include vehicle qualifications, such as whether vehicles have required or preferred software or hardware (e.g., cellular communications transceiver, strength of processor, transmitter, and antenna), location of vehicles 104 within the dissemination area 118, location of vehicles 104 within the delegation zones 128, 130, 132, 134, direction of travel of vehicles 104 within the area or zone, number of recent and/or historic communications of vehicles 104, number or nature of recent and/or historic communications of vehicles 104.

Regarding number of contacts, for instance, the central server 110 may consider a Degree of Contacting for each delegate-vehicle candidate 104. Degree of Contacting is a number of other vehicles that a vehicle being evaluated has directly encountered per unit time, such as within a most recent one minute, five minutes, twenty-four hours, a present time-of-day on a previous day (e.g., same two-hour time window on the day one week ago), etc. In one embodiment, the Degree of Contacting, for each vehicle 104, is represented by:

$$C(p_i) = |N_1(p_i)|$$

wherein $N_1(p_i)$=number of contacts within one communication hop for the considered vehicle $p_i$. A communication hop is a single short-range communication. For instance, if a Vehicle A (not called out in FIG. 1) communicates with Vehicle B, Vehicle B communicates with Vehicle C, and vehicle A does not communicate directly with Vehicle C, then Vehicle A is communicating with Vehicle B via one hop, and Vehicle C via two hops.

Each particular vehicle 104 is aware of the vehicles 104 replying to messages or sending messages within range of the particular vehicle 104. Each vehicle 104 is aware of the identity (e.g., unique vehicle identifier) and number of vehicles that it communicates with via one hop and via multiple hops from information in transmissions from the other vehicles. The Degree of Contacting represents the number of vehicles directly contacted, via one hop, by the particular vehicle 104.

The central server 110 may also consider a Degree of Facilitating for each delegate-vehicle candidate. The Degree of Facilitating is a number of vehicles contacted by the vehicle indirectly per unit time. The Degree of Facilitating may identify a number of hops qualifying for indirect communication (in terms of spatial-domain routing such as Vehicular Ad hoc Network routing protocols, or temporal-domain routing such as Delay Tolerant Network routing), such as four hops, five hops, six hops, etc. As with the Degree of Contacting, a variety of time frames may be used for the unit time, such as a most recent one minute, five minutes, twenty-four hours, select time window, etc.

In one embodiment, each particular vehicle 104 maintains and shares in its short-range-broadcasted messages a contact or neighborhood list identifying each vehicle 104, generically or specifically (e.g., by unique vehicle identifier) with which the particular vehicle 104 is, or has been, in direct contact. In this way, each vehicle 104, having its own neighborhood list, and receiving the neighborhood lists of those it is in contact with, can identify vehicles that it is able to reach indirectly, but not directly, by comparing its neighborhood list to the neighborhood list of the vehicles it is in contact with.

For example, each vehicle keeps a type of a neighborhood list, where, if used collectively with similar information from other vehicles, determines the vehicles it can reach in a single hop, two hops, etc.

Utilizing these, similar, or other principles of short-range communication protocol, each vehicle 104 (or the central server 110 or system operator having the information) is able to determine how many vehicles it is contact with directly (i.e., one hop), and how many via more than one hop.

The central server 110 in some scenarios considers a Degree of Similarity, such as when the central server 110 is comparing two vehicle candidates for the delegate role. The Degree of Similarity represents a similarity amongst the vehicles directly contacted by the respective vehicles. The Degree of Similarity variable is described further below, regarding potential transfers of delegation from one vehicle 104 to another.

All or any of these Degrees, or other variables for identifying a delegate, are in some embodiments, computed locally at the on-board computer of each vehicle 104. All or any of these Degrees, or other variables for identifying a delegate, are in some embodiments, computed, at least in part, remote to the vehicles 104, such as at the central server 110.

The Degree of Contacting and Degree of Familiarity, in some embodiments, weigh very heavily in selecting a delegate vehicle, and in some embodiments a vehicle having the highest of each of these variables in an area is selected as the delegate for the area. In a contemplated embodiment, these two variables may be weighted for use in the process of selecting a delegate vehicle (or migrating a delegate assignment). In this way, by way of simplified illustration, if Vehicle A (not called out in FIG. 1) has a Degree of Contacting=5 and Degree of Familiarity=6, and Vehicle B has a Degree of Contacting=6 an Degree of Familiarity=5, selection of the preferred delegate of the two Vehicles A, B would depend on whether the Degree of Contacting or Degree of Facilitating was more-heavily weighted in the delegation algorithm.

In one particular embodiment, the process of selecting a delegate (or migrating a delegate assignment) is based on a consolidated threshold representing a combination of various quantifiable factors, which may be weighted as desired. For example, the consolidated threshold can be a single value resulting from combination of a Degree of Contacting, a Degree of Facilitating, a value representing a distance from a center of a zone, etc., with weight added to any of the factors as desired (for example by multiplying the factor by a constant).

As provided, above, other variables that may be considered in determining a delegate vehicle 120, 122, 124, 126 include location of a vehicle 104 within an area 118, location of vehicles 104 within a delegation zone 128, 130, 132, 134, direction of the vehicle 104, etc. For instance, the central server 110 may be configured to determine that although a first vehicle has the highest Degree of Contacting and Degree of Familiarity, a second vehicle should be the delegate vehicle for a specific zone because the second vehicle has the second highest scoring in these two Degree factors and is located near a center of the zone, while the first vehicle, though having the higher score for the two Degree factors, is located at an edge of the zone and moving toward the edge. For such a scenario, the server 110 would be programmed to take advantage of the fact that the first vehicle will not likely be able to disseminate the message to any vehicles in the subject zone, or at least not to as many as the vehicle that is expected to be positioned in the zone longer following seeding of the message to the delegate vehicle, or following any point in time at which the evaluation is performed.

Generally, the delegation algorithm is configured to select one or more delegation vehicles allowing for the most efficient dissemination of information in one or more messages.

Along with the function of selectively identifying at least one delegate vehicle 120, 122, 124, 126 per zone 128, 130, 132, 134, the delegation algorithm is in some embodiments configured to cause the central server 110 to consider whether to select more than one delegate vehicle per zone. Variables for this consideration can include a speed with which it is desired to disseminate the message, which can be referred to as a tolerance or threshold for latency. With a greater number of designated vehicles receiving the message via initial long-range communication 106 (e.g., per zone 128, 130, 132, 134), the message is more likely to reach more vehicles 104, and eventually all vehicles 104, sooner. With the increased long-range communications 106, though, comes increased cost.

As such, the central server 110 in some embodiments balances a cost of the dissemination with a threshold for latency for the message being disseminated. The cost may include a variety of types of cost, such as financial cost of initiating long-range communications and/or of maintaining them (e.g., airtime), network processing burden, remote sub-system 102 processing burdens, etc. For example, for messages having a very low level of importance (e.g., a non-safety-related, non-critical software upgrade, soft news (e.g., sports scores)), the latency can be very high (i.e., delayed delivery tolerate), so the dissemination cost can generally be kept relatively very-low. According to the teachings of the present disclosure, dissemination cost are kept down by, for example, defining relatively larger delegation zones and/or identifying a relatively low number of delegate vehicles, overall, per area, and/or per zone.

Figure 2:
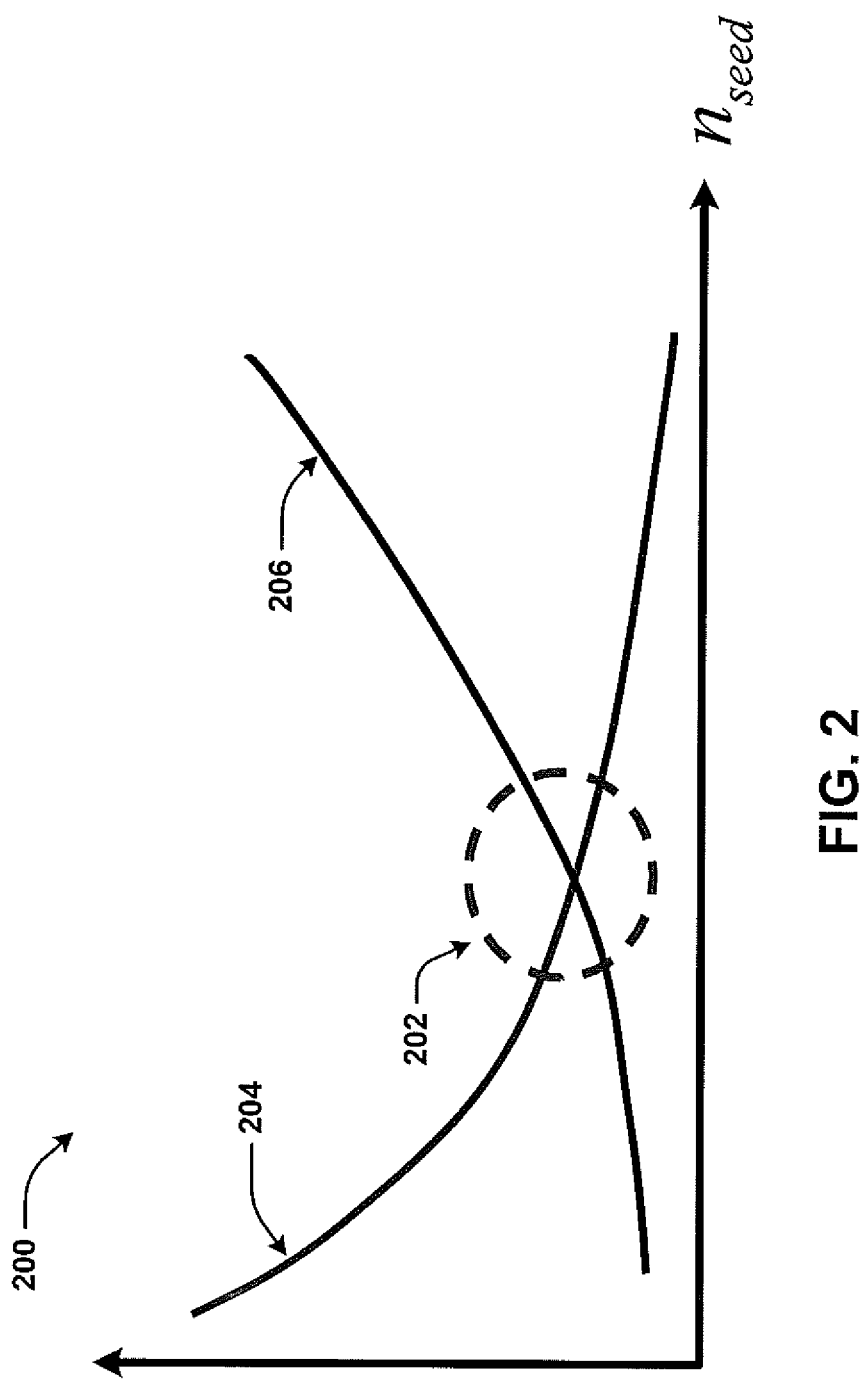
FIG. 2 illustrates graph showing a relationship between cost of dissemination and latency, as a number of delegate vehicles increases, according to an embodiment of the present disclosure.

As such, the delegation algorithm is configured to identify a generally optimal number of delegate vehicles to achieve an appropriate tradeoff between cellular communication cost and information dissemination latency. FIG. 2 illustrates a chart 200 of a relationship between cost and latency as the number of delegate, or seed vehicles $n_{seed}$ is increased, according to an exemplary embodiment. As shown, cost and latency are generally inversely proportional, in that cost generally increases as latency of message delivery is decreased. One optimal solution, according to the exemplary embodiment, is illustrated by reference number 202, whereat a latency curve 204 (latency ($n_{seed}$)) and a cost curve 206 (cost ($n_{seed}$)) intersect.

In a particular embodiment, the number of delegate vehicles in a geographic region can be formulated as a constraint-optimization problem as follows:

$$\min n_{seed}$$

$$s.t. \begin{cases} C(n_{seed}) \le C_{Threshold} \\ L(n_{seed}) \le L_{Threshold} \\ \alpha f_1(C(n_{seed})) + \beta f_2(L(n_{seed})) \le F_{Threshold} \\ \alpha + \beta = 1 \end{cases}$$

where the first line ($C(n_{seed}) \le C_{Threshold}$) represents a cost function, the second line ($L(n_{seed}) \le L_{Threshold}$) represents a latency function, and the third line represents a joint utility function. The fourth line ($\alpha+\beta=1$) includes variables ($\alpha$ and $\beta$) that are different in different scenarios.

A close-form solution and a heuristic solution can be achieved.

For example, for an emergency scenario, $\alpha=0$, $\beta=1$, $\rightarrow n_{seed}=N$ For example, for a delay-tolerant application, $\alpha=1$, $\beta=0$, $\rightarrow n_{seed}=1$ In one embodiment, the central server 110 is configured to consider historic behavior of vehicles 104, such as historic travel routes and/or communications. By considering historic behaviors, the central server 110 can better identify vehicles 104 that are more likely to be in contact with a higher number of other vehicles, directly, or indirectly via multiple hops. As an example of this concept in operation, the central server 110, from analysis of behavior of vehicles and/or by input by an operator of the system 100, may determine that a particular vehicle 104, such as a taxi cab or postal delivery vehicle, is likely to move extensively within the corresponding zone during a time period, such as within the next minute, next ten minutes, next hour, etc.

IV. Message Seeding

Once delegate vehicles 120, 122, 124, 126 are identified, the central server 110 seeds the message to the network of vehicles 104 by transmitting the message to the selected delegate vehicles 120, 122, 124, 126 by long-range transmission 106. As provided above, the long-range transmission 106 may be made via cellular communications. As also provided, the long-range transmission may be made via base station transceivers 112, a transportation-system transmitter or transceiver (not shown), such as a roadside transceiver, or other.

By using the long-range network to seed a relatively-small subset of the total vehicles 104, detriments such as burden on the long-range network and cost of communications are greatly reduced as compared with the conventional procedure of communicating the message to every vehicle 104 via long-range communication 106.

V. Message Propagation

The processor of each delegate vehicle 120, 122, 124, 126, executing instructions (e.g., a dissemination algorithm) in the memory of the vehicle, causes the vehicle 104 to receive the message via the long-range network 106. Upon receipt, the on-board computer processes the message, such as by caching the message in a short-term storage being a part of, or separate from, the memory of the on-board computer.

Each delegate vehicle 120, 122, 124, 126 propagates the message to other vehicles 104 within range of its short-range transmissions 108. This propagation is performed in accord with the instructions of the dissemination algorithm (e.g., a dissemination protocol) stored in the memory of the on-board computer and/or instructions in the message itself.

In some embodiments, the dissemination algorithm includes or generates a dissemination time factor representing a time in which it is desired or required to disseminate the message to all or substantially all target vehicles 104. In any of the steps of defining one or more dissemination areas, defining one or more delegation zones, identifying delegate vehicles, and propagating the message (e.g., how the message is propagated), the determining entity/entities (server 110, etc.) may consider a preferred or required maximum expected delay in transmitting the message. For instance, if it is desired that all vehicles 104 in an area 118 receive a message within 20 minutes, the zones and/or delegate vehicles will be selected to facilitate accomplishing the dissemination goal.

As such, in the dissemination process, the message is injected, or seeded, by the central server 110 intelligently (i.e., only to selected delegates) into the pool of vehicles 104, and the delegate vehicles 120, 122, 124, 126 forward the message by broadcasting the message to all other vehicles within range (a viral-spread manner), wherein the vehicles receiving the message by short-range communication can in turn re-broadcast the message to vehicles in their range.

In some embodiments, the vehicles 104 receiving the message only from a delegate vehicle 120, 122, 124, 126 do not re-distribute the message, so that only delegate vehicles 120, 122, 124, 126 transmit the message. Benefits of this approach include limiting short-range communication traffic.

In one contemplated embodiment, the delegate vehicles 120, 122, 124, 126 and/or non-delegate vehicles receiving the message transmit the message to non-vehicle nodes, such as a transceiver (not shown) of the transportation infrastructure for further dissemination in the same or other areas 118 or zones 128, 130, 132, 134. In this way, vehicles in a remote zone that is not reachable by implemented long-range communication (e.g., no vehicles in the remote zone have cellular coverage, at least at the time) can receive the message through the infrastructure. Any needed instructions facilitating transmission of the message outside of the network of vehicles 104 through non-vehicle nodes are provided in the dissemination algorithm (e.g., dissemination protocol) in the on-board computers of the vehicles 104 and/or in the message.

The system 100 may also be configured to include a feedback mechanism allowing evaluation or determination of sufficient dissemination (e.g., by the central server 110 and/or delegate vehicles 120, 122, 124, 126). For example, a dissemination protocol in the vehicles 104 may cause them to broadcast or otherwise transmit in a message an indication of receipt of the disseminated information, and cause all vehicles or just delegate vehicles to receive and process such indication from other vehicles. Feedback can also be initiated at the vehicles and transmitted to the central server 110. Such feedback could be initiated, for example, at the vehicle automatically by the on-board computer (e.g., upon noticing that an expected feed or update was not received) or by the vehicle operator. The central server 110 can then evaluate effectiveness of the dissemination from these types of feedback, and use the results to change (e.g., migrate one or more delegations, as described in the following section), supplement (e.g., assign the delegate role to additional vehicles and/or to non-vehicle notes), or otherwise improve the present dissemination and/or to adjust parameters of the dissemination algorithm for future disseminations.

In one contemplated embodiment, the central server 110, following initial selection of delegate vehicles 120, 122, 124, 126, initiates selection of one or more additional delegation vehicles. The central server 110 may determine, for example, that the information is not being sufficiently disseminated. The central server 110 in some embodiments makes this determination automatically, such as based on feedback from other components of the dissemination system 100 (e.g., delegate vehicles 120, 122, 124, 126, other vehicles 104), or makes the determination based on input (e.g., an order) by personnel of the remote sub-system 102.

VI. Migration of Delegation

In some embodiments, vehicles 104 in the system 100 are configured to determine whether a previously assigned delegation should be re-assigned to another vehicle 104. As described above, various actors may perform functions of the present disclosure, though one is described for illustration, so that, for example, the central server 110 (or the vehicles $P_i$ or $P_j$) may determine whether to migrate a delegation from a previously appointed delegate vehicle $P_i$ to a vehicle $P_j$ not previously appointed as a delegate for the particular dissemination.

The system 100 may be configured to initiate or consider a migration in response to various stimuli. For instance, delegate vehicles 120, 122, 124, 126 may be programmed to seek re-delegation to another vehicle 104 under certain circumstances, such as when the delegate vehicle 120 determines that it is leaving its corresponding zone 128. Other exemplary stimuli include the delegate vehicle 120 or the central server 110 determining that it is not moving sufficiently (e.g., about town) or not having sufficient contacts with other vehicles 104.

In considering whether a delegate-candidate vehicle $P_j$ will likely be a better delegate going forward than a vehicle $P_i$ already assigned as a delegate, the on-board computer of one of the vehicles (e.g., the on-board computer of the previously appointed delegate vehicle $P_i$) considers any of the aforementioned considerations for initially identifying a delegate vehicle. That is, the on-board computer considers variables such as whether the vehicle $P_j$ has required or preferred software or hardware, location of vehicles $P_i$, $P_j$ within the dissemination area 118, location of vehicles $P_i$, $P_j$ within the delegation zones 128, 130, 132, 134, direction of travel of the vehicles $P_i$, $P_j$ within the area 118 or zone 128, 130, 132, 134, number of recent and/or historic communications of the vehicles $P_i$, $P_j$, number or nature of recent and/or historic communications of vehicles 104, and other historic, recent, or present behavior.

The number and nature of contacts may include consideration of the Degree of Contacting and Degree of Facilitating described above. As also mentioned above, the on-board computer may consider a Degree of Similarity, which is a standard for comparing past V2V communications of the two vehicles $P_i$, $P_j$.

In one embodiment, the Degree of Similarity is represented by:

$$S(p_i, p_j) = \frac{|N_1(p_i) \cap N_1(p_j)|}{\min(|N_1(p_i)|, |N_1(p_j)|)}$$

where $N_1(p_i)$ is the set of one-hop contacts for the first vehicle $P_i$, and $N_1(p_j)$ is the set of one-hop contacts for the second vehicle $P_j$. |.| is the operation function to measure the number of element of a given set. For example, $|N_1(p_i)|$ is the number of one-hop contacts for the first vehicle $P_i$, and $|N_1(p_j)|$ is the number of one-hop contacts for the second vehicle $P_j$. From the equation above, in the immediately preceding paragraph, the Degree of Similarity will range between and including a factor of 0 and 1 depending on the number of one-hop contacts for the respective vehicles. For example, if the two vehicles are contacting the same other vehicles, their Similarity will be 1. For determining Degree of Similarity, the neighborhood lists of the vehicles with which the vehicles $P_i$, $P_j$ communicate are compared.

As with the initial assignment of the delegate role, location and/or travel direction of the vehicles $P_i$, $P_j$ within the area 118 or zone 128, 130, 132, 134 may be considered. For example, a delegation migration algorithm may be configured so that delegation is changed to a second vehicle $P_j$ from a first vehicle $P_i$, with the second having more one-hop and multiple hop contacts, because the first vehicle $P_i$ is apparently leaving the zone while the second vehicle has recently entered the zone, is moving generally toward a center of the zone, and/or is otherwise expected to move about the zone for a relatively long period of time (e.g., relative to the first vehicle $P_i$, $P_j$,) for propagating the already-seeded message to a greater number of vehicles 104 in the zone going forward.

If it is determined, such as by the previously-designated vehicle $P_i$, between the two vehicles $P_i$, $P_j$, or by the central server 110, to migrate a delegate assignment from a delegate vehicle $P_i$ to another vehicle $P_j$, the initial delegate vehicle $P_i$, from then on, no longer broadcasts the message, while the newly-assigned delegate $P_j$ proceeds to broadcast the message.

In some embodiments, delegates continue to broadcast a message until the earlier of a trigger, such as: (1) delegation is re-assigned, as described above, (2) a time period for disseminating the message has expired, and (3) a number of broadcasts of the message has been accomplished. The latter two triggers, and similar, are in various embodiments identified in the message and/or in the dissemination program of the on-board computers.

As an example of a time-period trigger, the system 100 may be configured to disseminate weather information for one or two hours, considering that weather will likely change during that time. The one or two hour trigger is in some embodiments directly identified in the message. In others, the message includes an indication that the message is a weather message, or a type of message for which dissemination is limited to one or two hours, as the case may be.

VII. Method of Disseminating a Message Using Select Delegates

Figure 3:
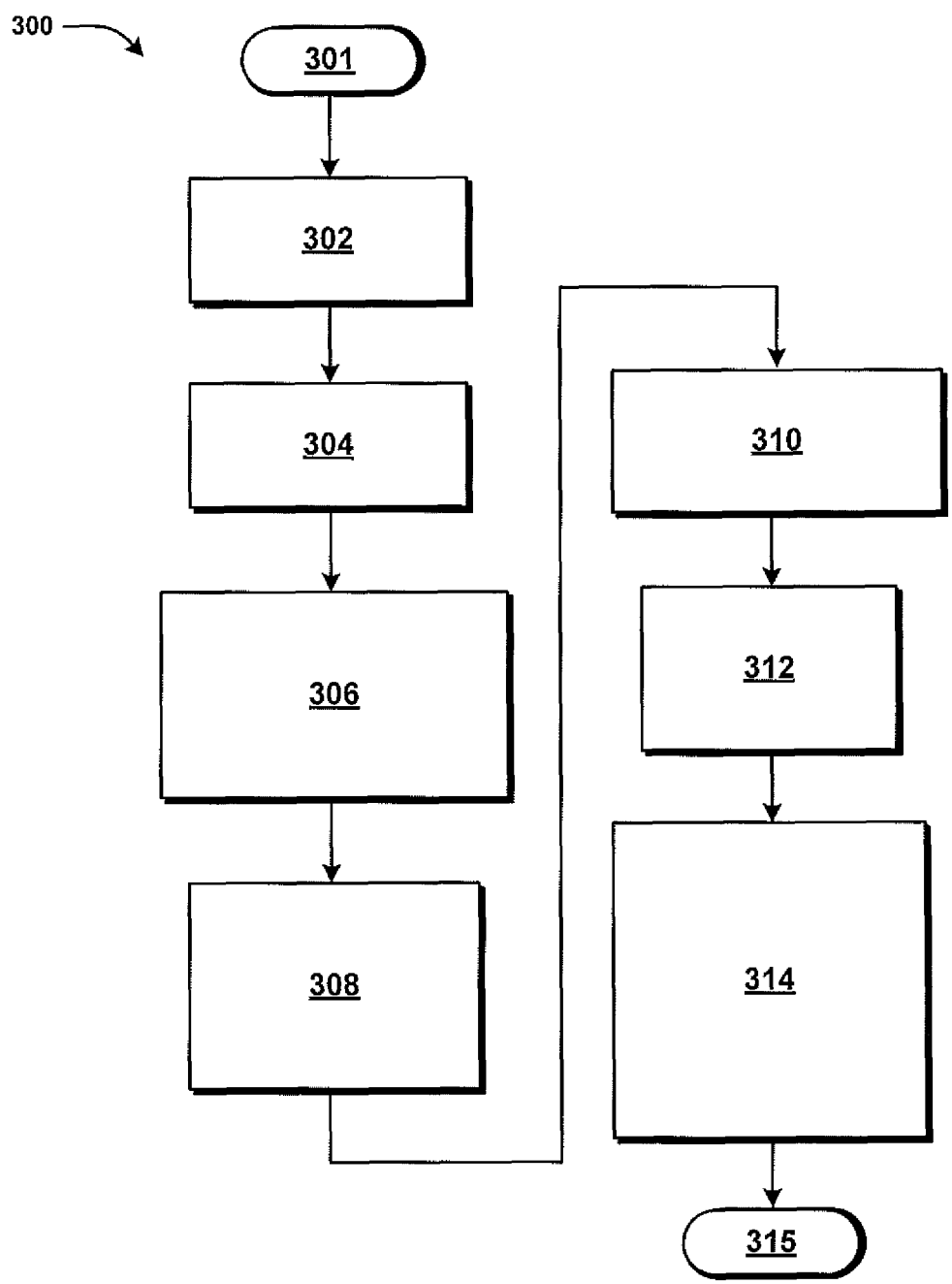
FIG. 3 illustrates an exemplary method for disseminating a message using long-range communications, short-range communications, and select delegate vehicles, according to an embodiment of the present disclosure.

FIG. 3 shows an exemplary method 300 for disseminating a message using select delegate vehicles, according to an embodiment of the present disclosure. It should be understood that the steps of the method 300 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 300 can be ended at any time. In certain embodiments, some or all steps of this process, and/or substantially equivalent steps are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with the processor of the central server 110 of the remote sub-system 102. It is contemplated that in some embodiments, some of the steps provided below are performed by one or more of the on-board computers of the vehicles 104.

The method 300 begins 301 and flow proceeds to step 302, whereat a dissemination area 118 (shown in FIG. 1) is defined in which to disseminate information. Step 302 may be performed by the remote sub-system 102, such as the central server 110. As provided above, the dissemination area 118 may be a country, state, metropolitan area, or city, a highway, portions of these, or other region. The area 118 may be defined to have any size or shape, such as rectangle, pentagon, hexagon, other regular or irregular polygons, circle, oval, and non-descript shapes. Boundaries of the dissemination area 118 are in various embodiments described in various ways, including at least in part by geographic coordinates (e.g., latitude and longitude) or GPS coordinates.

At step 304, the remote sub-system 102 defines one or more delegation zones 128, 130, 132, 134 of the area 118. In one embodiment, the central server 110 identifies the delegation zones 128, 130, 132, 134. The delegation zones 128, 130, 132, 134 may have any size or shape. Boundaries of the zones are in various embodiments described in various ways, including, as with the dissemination area 118, at least in part by geographic coordinates or GPS coordinates. As described above, the zones may be generally static or dynamic, or determined per dissemination based on present time or recent variables.

At step 306, at least one delegate vehicle 120, 122, 124, 126 is identified per delegation zone 128, 130, 132, 134. As described, variables for selecting the delegate vehicles 120, 122, 124, 126 include, in various embodiments, any of historic vehicle concentration within the dissemination area 118, present vehicle concentration within the dissemination area 118, size of the dissemination area 118, desired timing for disseminating the message to the vehicles 104 throughout the dissemination area 118, and vehicle 104 qualifications.

Exemplary vehicle qualifications for consideration in identifying one or more delegate vehicles 120, 122, 124, 126 include whether vehicles 104 include required or preferred software or hardware (e.g., cellular communications transceiver), location of vehicles 104 within the dissemination area 118, location of vehicles 104 within the delegation zones 128, 130, 132, 134 (e.g., a center of the zone is generally preferred or more preferred, and adjacent an edge generally not or less preferred), direction of travel of vehicles 104 within the dissemination area 118 or delegation zone 128, 130, 132, 134, number of recent and/or historic communications of vehicles 104, and number or nature of recent and/or historic communications of vehicles 104.

As described above, the central server 110 may consider a Degree of Contacting and/or a Degree of Facilitating for each delegate-candidate vehicle 104. In some embodiments, a Degree of Similarity for each or some delegate-vehicle candidates is considered in step 306.

Generally, the dissemination algorithm is configured to select one or more disseminating vehicles allowing for the most efficient dissemination. Along with identification of at least one delegate vehicle per zone, step 306 may include consideration of whether to select more than one delegate vehicle per zone, as described above.

In one contemplated embodiment, the delegation algorithm enables selection of one or more delegate vehicles without reference to delegation zones. The algorithm can, for example, select some delegate vehicles with the zone-based format (e.g., steps 304, 306) and some without. For example, the central server 110 may be programmed to recognize certain vehicles 104 as automatic delegates, or delegates under certain circumstances (e.g., time of day, based on their location at the time). Such non-zone-based delegates may include, for example, a taxi cab or a postal delivery vehicle, or a vehicle 104 known from historical data to travel a long distance (e.g., long commute to/from work), irrespective of the zone in which the vehicle is in at the time of delegate selection.

Following step 306, at step 308, a message is seeded into the network of vehicles 104, such as by the central server 110. The seeding involves transmitting the message to the one or more selected delegate vehicles 120, 122, 124, 126 via a long-range communication channel 106, such as via a BTS 112 or a road-side transceiver (not shown).

At step 310, the processor of each delegate vehicle 120, 122, 124, 126, executing instructions in memory of the vehicle, causes the vehicle 104 to receive the message via the long-range network. Upon receipt of the message, at step 312, the on-board computer of each delegate vehicle 120, 122, 124, 126 processes the message, such as by caching the message in a short-term or longer-term storage, being a part of, or separate from, the memory of the on-board computer. By storing the message, the delegate vehicle 120, 122, 124, 126 can disseminate it over an extended period of time, such as for hours, an entire day, week, month, etc. This can facilitate dissemination as a delegate vehicle 120, 122, 124, 126 may, for example, go for relatively long periods of time without any or many encounters with other vehicle 104, but then later have the message for broadcasting for many later encounters. In this way, the system 100 better ensures effective dissemination to target vehicles 104 over time, especially for non-critical messages that are very delay tolerant.

At step 314, each delegate vehicle 120, 122, 124, 126 propagates the message to other vehicles 104 within range of its short-range broadcasts 108. The propagation is performed in accordance with instructions of a dissemination algorithm (e.g., a dissemination protocol) stored in the memory of the on-board computers and/or instructions in the message itself. For example, for some messages (e.g., by type and/or per dissemination order of personnel) are to be disseminated more aggressively than others. While message importance can also be considered in the definition of zones and selection of delegate vehicles, the dissemination itself can also be tailored to the message. For instance, the dissemination protocol and/or message instructions can call for the delegate vehicles to broadcast according to any of various formats, including (1) periodically, (2) generally continuously, (3) only when encountering another vehicle (e.g., in response to receiving an introduction message or replay, or performing a short-range communication handshake). Continuous broadcast would correspond with, for example, messages of relatively high importance, and periodic broadcasts with long periods between broadcasts would correspond with messages of very low importance. By not transmitting continuously, short-range data traffic is reduced as the delegate vehicles 120, 122, 124, 126 propagate the message less often.

In some embodiments, the delegate vehicles 120, 122, 124, 126 do not broadcast the message and does not transmit it to every other vehicle 104. The dissemination may be based on needs of the other vehicles 104, as confirmed for example, through communications from each other vehicles 104. For example, some of the vehicles 104 in the system 100 may be programmed or personalized to communicate to delegate vehicles 120, 122, 124, 126 that the vehicle accepts messages of a certain type or types, such as regarding weather or traffic. Some vehicles, on the other hand, may be programmed or personalized to not accept certain types of information. As another example, the delegate vehicles 120, 122, 124, 126 may recognize that a message is only relevant to a certain qualifying vehicles, such as only for Chevrolet Volts, only for vehicles registered in a certain state or county, or only vehicles that have not previously received this or equivalent information. In these ways, again, short-range data traffic is reduced as the delegate vehicles 120, 122, 124, 126 do not share the data with every other vehicle 104.

As provided above, in one contemplated embodiment, the delegate vehicles 120, 122, 124, 126 and/or non-delegate vehicles receiving the message transmit the message to non-vehicle nodes, such as a transceiver (not shown) of the transportation infrastructure for further dissemination in the same or other areas 118 or zones 128, 130, 132, 134.

As also provided, above in one contemplated embodiment, the central server 110, following initial selection of delegate vehicles 120, 122, 124, 126, (step 306), and perhaps following some or all dissemination steps 308-314, initiates selection of one or more additional delegation vehicles. The central server 110 may determine, for example, that the information is not being sufficiently disseminated. The central server 110 in some embodiments makes this determination automatically, such as based on feedback from other components of the dissemination system 100 (e.g., delegate vehicles 120, 122, 124, 126, other vehicles 104), or makes the determination based on input (e.g., an order) by personnel of the remote sub-system 102.

As provided above, the central server 110 may consider, in any of the steps 302-314, a preferred or required maximum expected delay for reaching every or substantially all target vehicles with the transmitted message. For instance, if it is desired that all vehicles in an area 118 receive a message within 20 minutes, the zones and/or delegate vehicles will be selected to facilitate accomplishing the dissemination goal. The method 300 may be repeated for other messages or end 315.

VIII. Method of Migrating Delegation and Subsequent Dissemination

Figure 4:
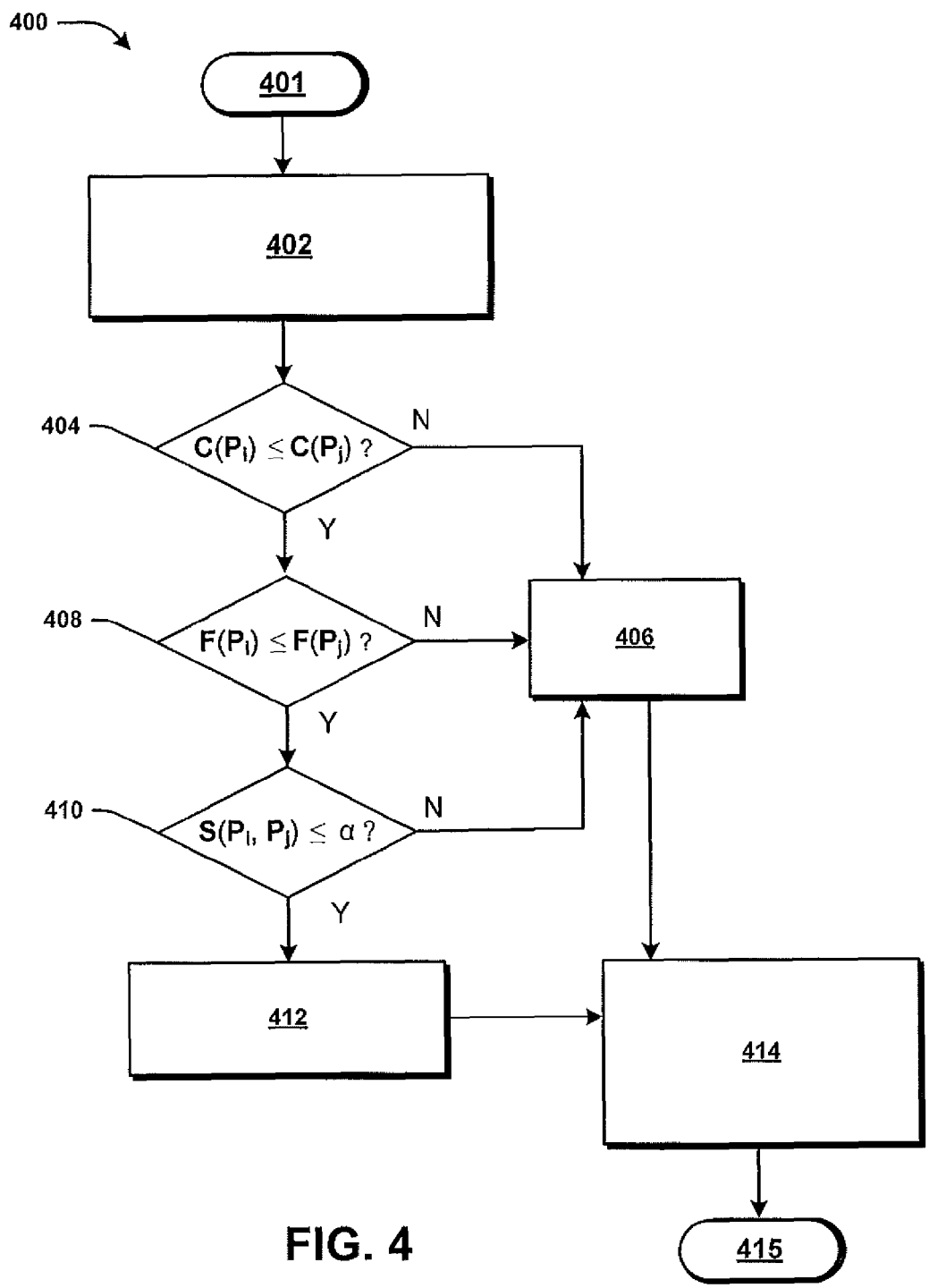
FIG. 4 shows an exemplary method for migrating delegate vehicle assignments in a system for intelligent dissemination of telematics information, according to an embodiment of the present disclosure.

FIG. 4 shows an exemplary method 400 for migrating a previous delegation from the initial delegate vehicle to the new delegate vehicle, according to an embodiment of the present disclosure. It should be understood that the steps of the method 400 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 400 can be ended at any time. In certain embodiments, some or all steps of this process, and/or substantially equivalent steps are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with the processor of the central server 110 of the remote sub-system 102. It is contemplated that in some embodiments, some of the steps provided below are performed by one or more of the on-board computers of the vehicles 104.

The method 400 begins 401 and flow proceeds to step 402, whereat a delegate vehicle $P_i$ and a non-delegate vehicle $P_j$ encounter each other and communicate. Although the present method 400 is described primarily with respect to the delegate vehicle $P_i$ encountering one other vehicle $P_j$, it is contemplated that the teachings of the disclosure can be applied to compare more than two vehicles at a time.

At step 404, the Degree of Contacting, described above, for each vehicle $P_i$, $P_j$ is compared. If the initial delegate vehicle $P_i$ has a higher Degree of Contacting than the non-delegate vehicle $P_j$, then flow proceeds to step 406, whereat the initial delegate vehicle maintains the delegate role. The Degree of Contacting variable is described in more detail, above.

If at step 404, the non-delegate vehicle $P_j$ has a higher Degree of Contacting than the initial delegate vehicle $P_i$, then flow proceeds to step 408, where the vehicles $P_i$, $P_j$ are compared to determine which has a higher Degree of Facilitating. The Degree of Facilitating variable is described in more detail, above.

If at step 408, the initial delegate vehicle $P_i$ has a higher Degree of Facilitating than the non-delegate vehicle $P_j$, then flow proceeds to step 406, whereat the initial delegate vehicle maintains the delegate role.

If at step 408, the non-delegate vehicle $P_j$ has a higher Degree of Facilitating than the initial delegate vehicle $P_i$, then flow proceeds to step 410, where the vehicles $P_i$, $P_j$ are compared to determine whether the Degree of Similarity is less than or equal to a predetermined threshold, represented by $\alpha$ in FIG. 4. The Degree of Similarity variable is described in more detail, above.

If at step 410, the Degree of Similarity is greater than the threshold $\alpha$, then flow proceeds to step 406, whereat the initial delegate vehicle $P_i$ maintains the delegate role. If at step 410, the Degree of Similarity is equal to or less than the threshold $\alpha$, then flow proceeds to step 412, whereat delegation is migrated from the initial delegate vehicle $P_i$ to the newly-assigned delegate vehicle $P_j$. In some embodiments, the vehicle $P_i$ relinquishing the delegation role reports the migration to the central server 110 and in some embodiments the newly-appointed delegate $P_j$ reports the migration.

Although exemplary steps of the method are shown in FIG. 4 and described in this section, the process of considering whether to migrate a delegation assignment in some embodiments includes these and/or other considerations, such as those described above. These other considerations include, for example, the aforementioned considerations for initially identifying a delegate vehicle, such as whether vehicles include required or preferred software or hardware (e.g., strength of processor, transmitter, and antenna), location of vehicles 104 within the dissemination area 118, location of vehicles 104 within the delegation zones 128, 130, 132, 134, direction of travel of vehicles 104 within the area or zone, number of recent and/or historic communications of vehicles 104, number or nature of recent and/or historic communications of vehicles 104, and other historic, recent, or present behavior.

At step 414, the delegate vehicle disseminates the message using the short-range communication network 108. In some embodiments, the delegate vehicle propagates the message until a triggering event, or earliest occurrence of one or various triggers. Exemplary triggers include (1) delegation being re-assigned, as described above, (2) a time period for dissemination the message has expired, and (3) a number of broadcasts of the message, by the delegate vehicle and/or by other vehicles.

The method 400 may be repeated as the delegate vehicle ($P_i$ or $P_j$), encounters other vehicles 104, for possible other migrations, or may end 415.

As described above, the system 100 may be configured to initiate or consider a migration in response to various stimuli. The delegate vehicles 120, 122, 124, 126 may be programmed, for example, to seek re-delegation to another vehicle 104 under certain circumstances, such as when the delegate vehicle 120 determines that it is leaving its corresponding zone 128. Other exemplary stimuli include the delegate vehicle 120 or the central server 110 determining that it is not moving sufficiently (e.g., about town) or not having sufficient contacts with other vehicles 104. For some of these embodiments, such as when the delegate vehicle 120 determines that it is leaving the zone, the delegate vehicle 120 may determine to migrate its delegation role without satisfaction of one or more of the inquiries 404, 408, 410, and/or following satisfaction of a relaxed form of some or all of the inquiries 404, 408, 410, such as the delegate vehicle 120 being able to migrate its role if the receiving vehicle $P_j$ has a Degree of Contacting that is non-zero, or above a certain threshold.

IX. Coordinated Fetch and Share Schemes

In one embodiment of the present disclosure, collaborative mechanisms to efficiently seed content (e.g., information in messages) into a network include use of long-range communications (e.g., cellular and/or transportation infrastructure), and sharing of the content between vehicles using short-range communications according to prescribed fetch and share techniques described in detail below. The particular content can be partial or entire content. For example, a software update can be delivered in a first part and a second part, or in three or more parts.

The fetch and share techniques optimize network access by using the low cost, peer-to-peer connectivity (such as any of those described above, e.g., DSRC and Wi-Fi®) for providing the content to as many vehicles as possible when the information is delay-tolerant—i.e., does not need to be delivered immediately. Content that would usually not be considered delay tolerant includes emergency information, such as about an emergency situation proximate a vehicle or a software update needed immediately for safe or proper vehicle operation.

Benefits of collaborative information fetching and sharing techniques allow similar level of service while lowering overall use of long-range (e.g., cellular) communication networks.

As described in further detail below, the techniques, in some embodiments, include dynamically adjusting time deadline-related fetching mechanisms to user preferences and/or user actions, such as by remembering information-access patterns for one or more vehicles and adjusting algorithms accordingly.

Coordinated fetch and share techniques improve remote data access throughput and information diversity across vehicles. Throughput relates to an amount of vehicles (e.g., number or percentage) receiving content. For instance, if a piece of content reaches 100% of intended vehicle recipients, maximum delivery, or throughput has been achieved.

Data diversity relates to a diversity of data in the system 100. Data diversity is increased when more different types of information has been distributed to vehicles 104 in the system 100.

During vehicle encounters and data exchange, the coordinated fetch and share scheme is used to increase content throughput and data diversity within a geo-spatial region.

In some embodiments, schemes can be referred to as being gossip-based because vehicles encountering each other in these embodiments communicate to determine whether each vehicle has data that the other does not have.

As provided below in further detail, these fetch and share schemes, in various embodiments, are triggered by circumstances such as: (A). a specified period of time elapsing, (B) a particular geographic area or location having been entered, and/or (C) a desire for increased data diversity within the network.

One aspect (D) includes an encounter-based inter-vehicle data exchange. The encounter-based data exchange promotes data diversity, and is performed based on share index information, as provided in detail below.

Although the following fetch and share schemes are described in a separate section of the disclosure, reference is made to aspects of other embodiments, and all embodiments herein may be combined in various combinations by those of ordinary skill in the art to accomplish desired goals for information dissemination.

A. Deadline-Based Fetch and Share Scheme

According to this scheme, the vehicle 104 or the remote sub-system 102 initiates a long-range communication between the vehicle 104 and the remote sub-system 102 for delivering particular content to the vehicle 104 if the vehicle 104 does not receive the particular content by a specified or determinable temporal deadline. Temporal deadlines are assigned to pieces of content directly, or to categories in which content is assigned.

For instance, if information is not received by a vehicle 104 within a specified deadline, the vehicle 104 or the remote sub-system 102 initiates a long-range communication (e.g., cellular call) to acquire data. In scenarios in which the vehicle 104 initiates the long-range communication, the vehicle 104 is notified in advance of particular content and an expected or desired time of receipt, or information from which an expected or desired time of receipt can be determined by the vehicle 104.

In scenarios in which the remote sub-system 102 initiates the long-range communication, the system 100 includes mechanisms by which the remote sub-system 102 determines that the vehicle 104 did not receive the particular content. In one embodiment, this mechanism includes the remote sub-system 102 receiving an indication from the vehicle 104 that the particular content was not received. In another embodiment, the mechanism includes the remote sub-system 102 determining that the vehicle 104 has not received the message in response to not receiving a confirmation or receipt message from the vehicle 104.

In one embodiment, the time-related, temporal deadline includes one or more of (i) an elapsed time since content ignition (i.e., since content transmission was initiated), (ii) an elapsed time since a date of last call, (iii) a storage expiration or cache expiration, and the like. A date of last call relates to a point in time after which content will be available for retrieval for a specified amount of time. For instance, a date of last call for particular content can be set as 12:00 a.m. of January 1 of a given year, with an elapsed time of ten days. In this example, the content would be available for ten days following the date of last call.

Storage expiration time and cache expiration time refer to a time through which content will be stored or cached, respectively, at the remote sub-system 102. For example, content may be stored or cached at the remote sub-system 102 with a storage or cache expiration of midnight of a certain date, after which the content will be deleted or moved within or from the remote sub-system 102.

The system 100 can be configured such that once a vehicle 104 has fetched the information, such as by requesting and receiving, or just receiving, the vehicle 104 goes on to share the data with other vehicles 104 via short-range communications.

An operator of the vehicle 104 may establish parameters for the deadline-based fetching in a variety of ways. For example, in one embodiment, the vehicle operator selects deadline parameters, and any other related parameters (e.g., time-related parameters) by way of a user-input device of the vehicle, such as a touch-sensitive, graphical-user interface (GUI). In another embodiment, the operator establishes the parameters at a remote computer, such as a mobile phone or personal computer, or by phone call, email, or communication via other medium to the remote sub-system 102. The established parameters may be stored and processed at the vehicle 104 and/or the remote sub-system 102. Alternatively, deadline information may be derived from intelligent vehicle navigation systems that are capable of performing trip identification. In such an embodiment, deadline information may be described in terms of time along the driver's route.

In some embodiments, deadlines are initially defined and/or subsequently adjusted based on historic performance of the system 100. The historic performance may include, for example, discernable patterns of access that vehicles 104 have had to long-range communications, patterns of access that vehicles 104 have had to other vehicles 104, patterns of access that vehicles 104 have had to infrastructure (e.g., roadside transmitters), and/or other such helpful patterns related to data delivery in the system 100. The techniques, in some embodiments, include dynamically adjusting information-fetching mechanisms to user preferences and/or user actions, such as by remembering information-access patterns for one or more vehicles and adjusting algorithms accordingly. As an example, deadline information may be adjusted based on information obtained from a digital map of roadside units that has been communicated to the vehicle. In such a scenario, the vehicle would have knowledge about potential access points along the path that may obviate the need for cellular access. In such a circumstance the deadline may be extended due to anticipated connectivity with immediate infrastructure. Likewise, congestion information from surrounding vehicles (in terms of number of communicating vehicles within communication range) may be included in the deadline algorithm as a means of efficiently spreading information across a local group of vehicles. In this scenario, an increasing trend of communicating vehicles could be used to extend a deadline based on anticipated information collection from other vehicles within the local group. A decreasing trend of communicating vehicles could be used to advance the deadline based on an anticipated sparse communication environment.

Figure 5:
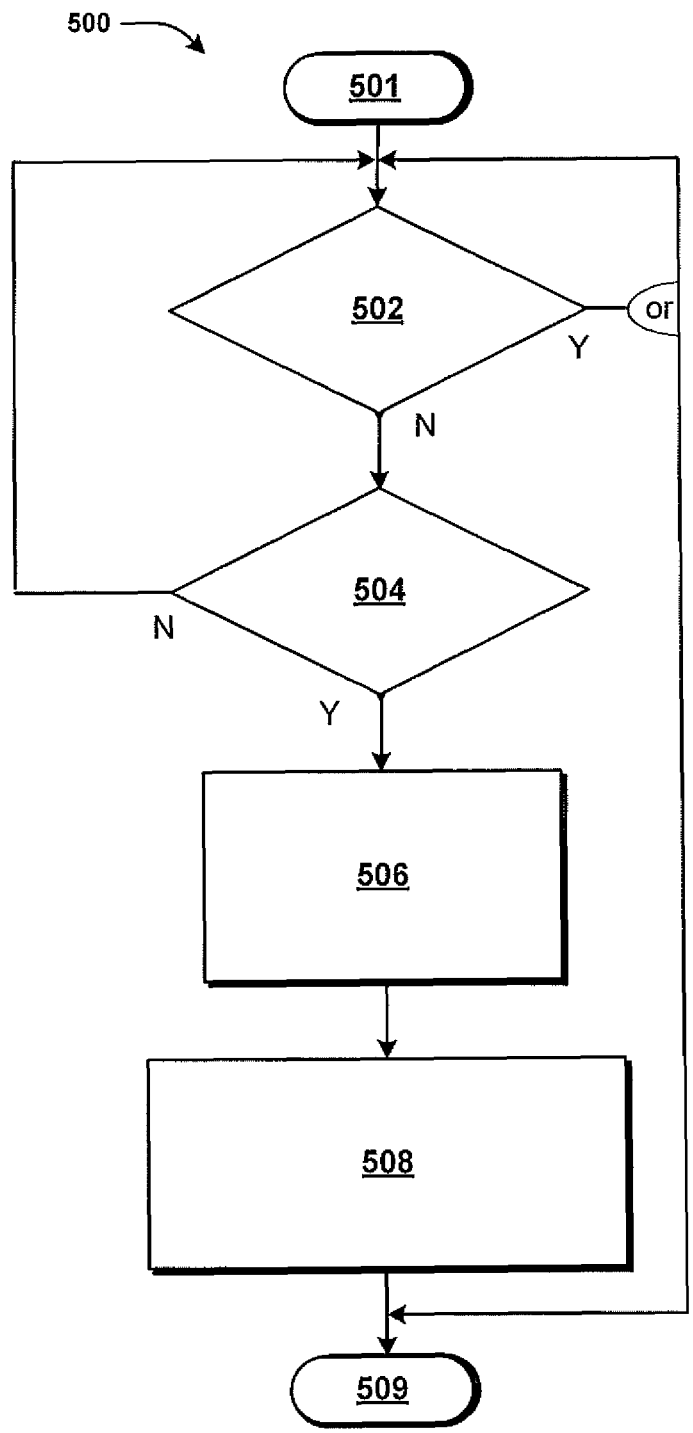
FIG. 5 shows a method for fetching and sharing information in response to passage of a deadline, according to an embodiment of the present disclosure.

FIG. 5 shows an exemplary method 500 for fetching and sharing information in response to passage of a deadline. It should be understood that the steps of the method 500 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 500 can be ended at any time. In certain embodiments, some or all steps of this process, and/or substantially equivalent steps are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with the processor of the central server 110 of the remote sub-system 102. It is contemplated that in some embodiments, some of the steps provided below are performed by one or more of the on-board computers of the vehicles 104.

The method 500 begins 501 and flow proceeds to step 502, whereat a particular vehicle 104 or the remote sub-system 102 determines whether the vehicle 104 has received particular content (e.g., complete or partial content). If the vehicle 104 has already received the content, then the method 500 may end, or repeat regarding other content.

At step 504, the vehicle 104 or remote sub-system 102 determines whether a deadline, such as those described above, has passed. If the deadline has not passed, flow proceeds back to step 502, as shown in FIG. 5, for re-consideration of whether the content has been received.

If at step 504, it is determined that the deadline has been reached, then flow proceeds to step 506, whereat a long-range communication is initiated for delivering the content directly to the vehicle 104. Following seeding of the content to the vehicle 104, the vehicle 104 may at step 508 disseminate the content to other vehicles 104 that the particular vehicle encounters in the system 100. The vehicle 104 may disseminate the content to other vehicles 104 per considerations described herein, and including disseminating the content to other vehicles 104 for a certain amount of time following the seeding to it of the content, until another vehicle assumes a delegation role that it had, or until other stopping points. The method 500 may end 509.

B. Geographic-Based Fetch and share Scheme

In some embodiments, a vehicle 104 or the remote sub-system 102 initiates a long-range communication to obtain particular content if the vehicle 104 has not received the content, such as from V2V data sharing, by a time at which the vehicle 104 reaches or passes a geographic transition point.

The transition point can be a point of interest that the vehicle 104 reaches. In a contemplated embodiment, the transition point is a point on a boundary of a geographic area that the vehicle 104 passes when entering or leaving the area. The transition point could be, for example, a boundary of a city, county, or other bounded area. In one embodiment in which the transition point relates to a boundary of a geographic area, the area prescribes a certain distance surrounding the vehicle 104 at a certain time. For instance, the geographic area can be defined by a five-mile radius around the vehicle 104 at a time at which particular content was initially seeded to vehicles of the system 100 from the remote sub-system 102.

Figure 6:
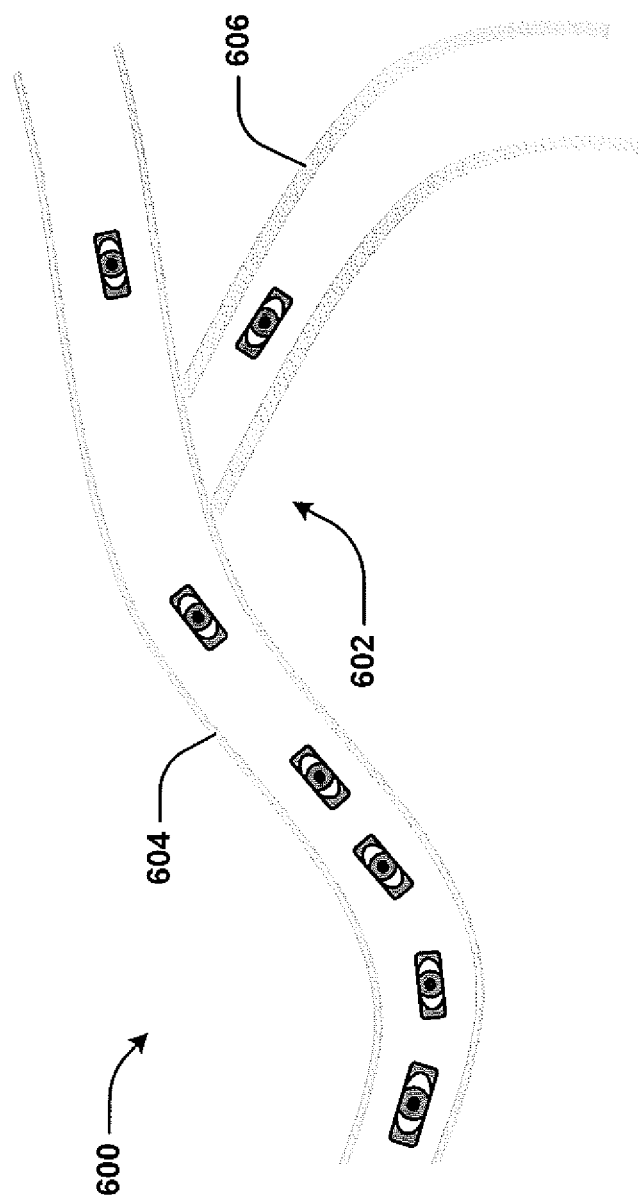
FIG. 6 shows an exemplary scenario illustrating a geographic transition point for use in the method of FIG. 8.

FIG. 6 shows a scenario 600 in which a transition point 602 is a point at which one class or type of road 604 changes to another class or type of road 606, such as from an interstate highway to a city road.

Figure 7:
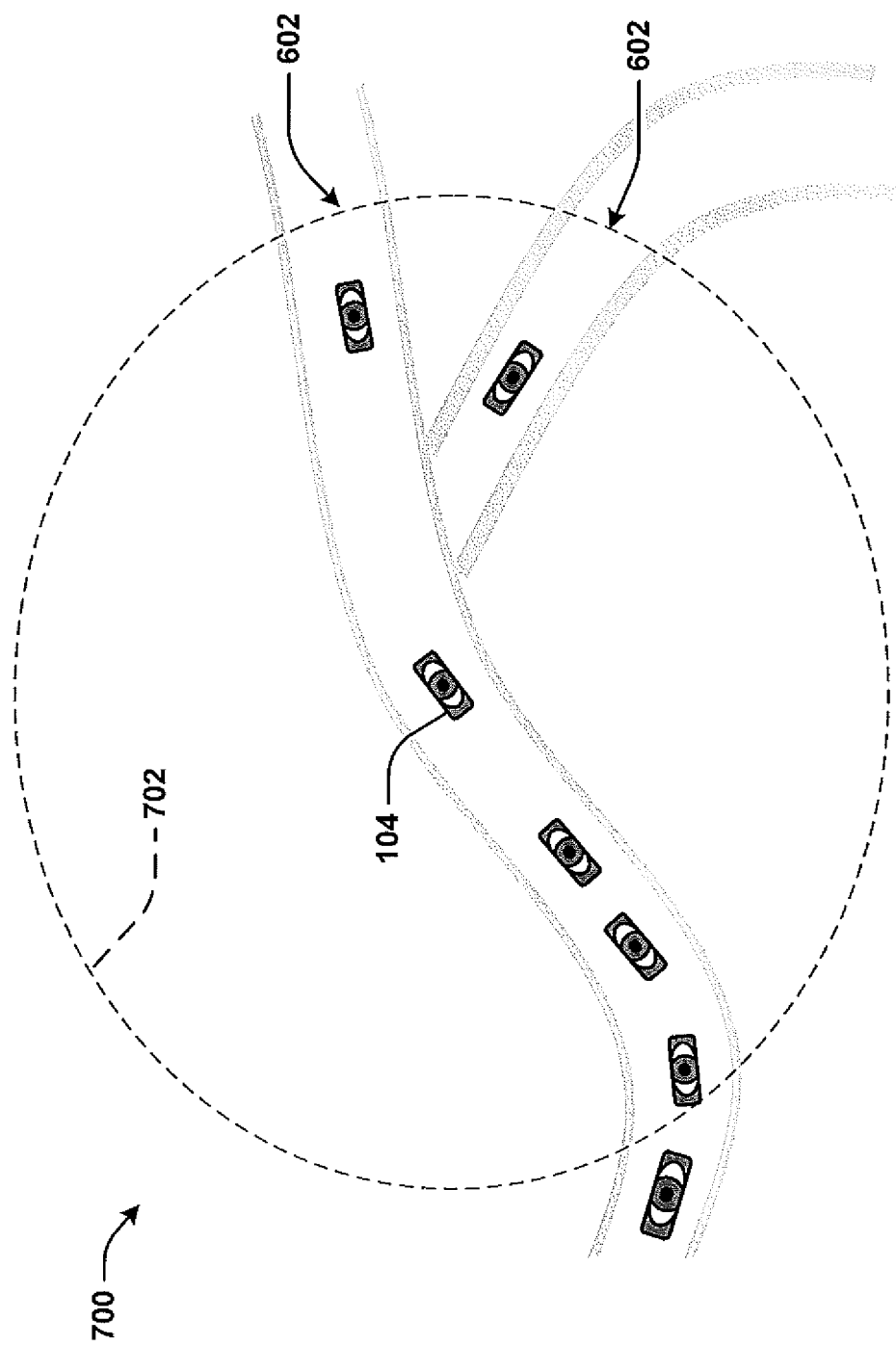
FIG. 7 shows an exemplary scenario illustrating another geographic transition point for use in the method of FIG. 8.

FIG. 7 shows a scenario 700 in which a fixed virtual boundary 702 is formed about a vehicle 104. Although a generally circular boundary 702 is shown, the boundary 702 may have any desired shape. Although particular exemplary transition points 602 on the boundary 702 are shown in FIG. 7, transition points 602 can be any point about the boundary 702 that the vehicle 104 may cross.

Exemplary shapes for the virtual boundary 702 include pentagon, hexagon, other regular or irregular polygons, circle, oval, and non-descript shapes (shapes not being associated traditionally with a name). The boundary 702 is in various embodiments described in any of a variety of ways, including by geographic coordinates (e.g., latitude and longitude) or global-positioning-system (GPS) coordinates. The boundary 702 may be described by waypoints defining its shape. The boundary 702 definition is stored or cached in the vehicle 104 and/or the remote sub-system 102 in connection with a digital map, from a digital map database, or independent of a map.

In the described scenario 600, the vehicle 104 or remote sub-system 102 is triggered to initiate a long-range communication to the vehicle 104 to deliver particular content to the vehicle 104 in response to the vehicle 104 passing a transition point 602.

Position of the subject vehicle 104 is determined in any of a variety of ways, such as by use of a GPS unit of the vehicle 104. Vehicle position can be represented by GPS coordinates, for example, and compared to the geographic point or area of interest on a digital map from a digital map database.

If information is not receive before the vehicle 104 reaches a transition point 602, the vehicle 104 or remote sub-system 102 initiates a long-range communication between the vehicle 104 and the remote sub-system 102 for transfer of the content to the vehicle 104.

In some contemplated embodiments, multiple transition points are established, and the long-range communication is initiated in response to the vehicle 104 encountering any of the transition points.

Transition points may be established in various ways, by various entities, without departing from the scope of the present invention. Transition points may be established by, for example, the remote sub-system 102 (e.g., the server 110 and/or personnel of the remote sub-system), the vehicle 104, or an operator of the vehicle 104. For instance, a vehicle operator may establish that long-range communications will be initiated (by the vehicle 104 or remote sub-system 102) to obtain certain infotainment (e.g., sports news or weather) in response to the vehicle 104 not receiving a regular or otherwise expected feed of such content by the time that the vehicle 104 is entering a highway. This could be a useful tool for the vehicle operator for occasions in which the operator is entering the highway for relatively-long trips, for example.

Or the operator, such as a stockbroker using the vehicle 104, could establish that the long-range communication will be established to obtain certain infotainment (e.g., stock or other business reports) in response to the vehicle 104 not receiving a regular or otherwise expected feed of such content by the time that the vehicle 104 is leaving a highway, or entering a business district in which the operator works.

It is contemplated that a temporal variable may be considered in the geographic fetch and share scheme. For instance, the system 100 (e.g., vehicle 104 or remote sub-system 102) in some embodiments initiates the long-range communication for fetching content if the transition point 602 is encountered before, after, within, and/or outside of a certain time or time range. For instance, the stockbroker may establish that the long-range fetch will only be initiated if expected content was not received when the vehicle 104 reaches a business-district transition point only on weekday mornings.

The system 100 can be configured such that once a vehicle 104 has fetched the information, such as by requesting and receiving, or just receiving, the vehicle 104 goes on to share the data with other vehicles 104 via short-range communications, as described herein.

In some embodiments of the present disclosure, an operator of the vehicle 104 establishes parameters for the geographic-based fetching in a variety of ways. For example, in one embodiment, the vehicle operator selects geographic parameters, and any other related parameters (e.g., time-related parameters) by way of a user-input device of the vehicle, such as a touch-sensitive GUI. In another embodiment, the operator establishes the parameters at a remote computer, such as a mobile phone or personal computer. The established parameters may be stored and processed at the vehicle 104 and/or the remote sub-system 102.

In some embodiments, transition points are initially defined and/or subsequently adjusted based on historic performance of the system 100. The historic performance may include, for example, discernable patterns of access that vehicles 104 have had to long-range communications, patterns of access that vehicles 104 have had to other vehicles 104, patterns of access that vehicles 104 have to infrastructure (e.g., road-side transmitters), and/or other such helpful patterns related to data delivery in the system 100. The techniques, in some embodiments, include dynamically adjusting geographic-based fetching mechanisms to user preferences and/or user actions, such as by ((remembering information-access patterns for one or more vehicles and adjusting algorithms accordingly. As an example, a geographic zone may be derived from historical travel information that is recorded by the vehicle. This zone may be subdivided into smaller regions that define the geographic boundaries used by the fetching algorithm. Alternatively, deadline information may be derived from intelligent vehicle navigation systems that are capable of performing trip identification. In such an embodiment, geographic boundaries may be described in terms of percentage or distance traveled along the driver's route. In yet another embodiment, user demands for information content can be geo-coded into the system (e.g., by recording the positioning system coordinates at a time of a user request for data content), and these markers can be used to define the geographic boundaries of the system.

Figure 8:
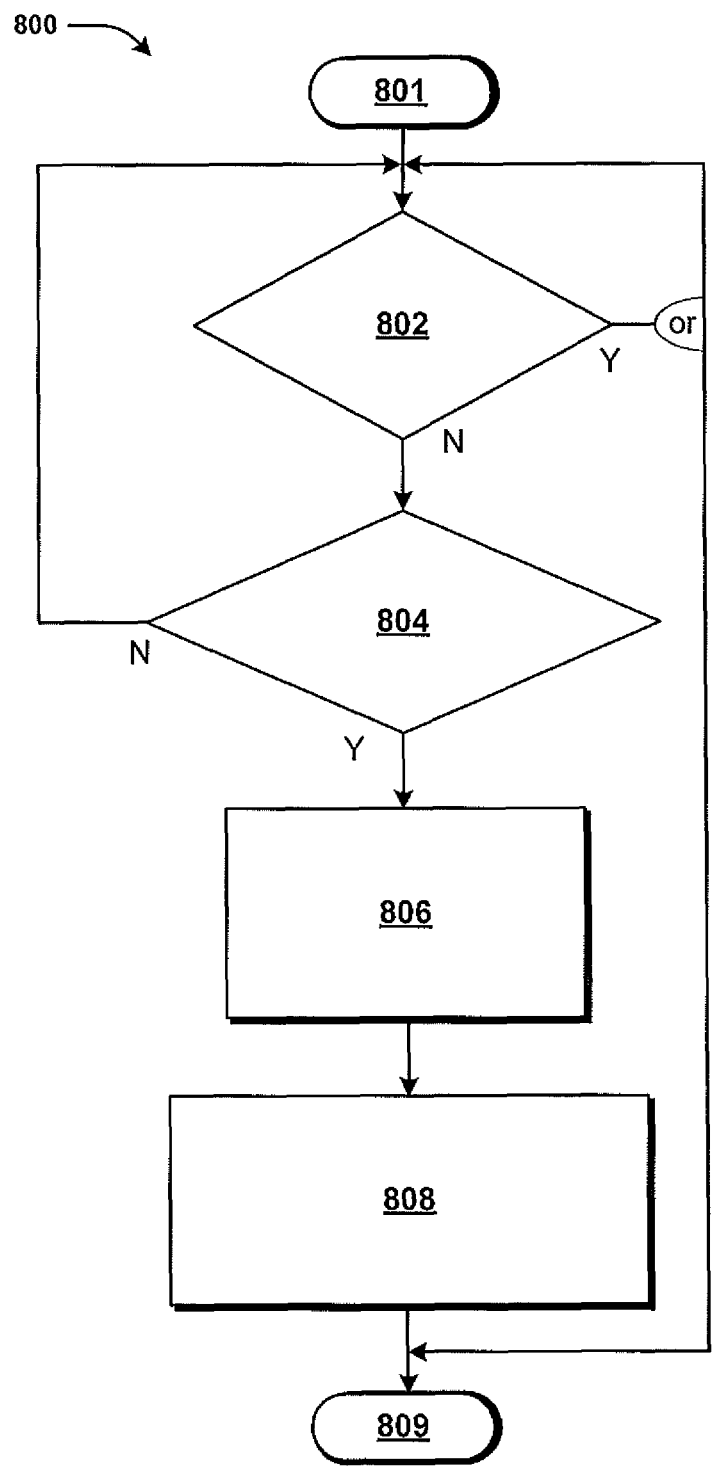
FIG. 8 shows a method for fetching and sharing information in response to a vehicle reaching a geographic transition point, according to an embodiment of the present disclosure.

FIG. 8 shows an exemplary method 800 for fetching and sharing information in response to a vehicle 104 reaching a geographic transition point 602. It should be understood that the steps of the method 800 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 800 can be ended at any time. In certain embodiments, some or all steps of this process, and/or substantially equivalent steps are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with the processor of the central server 110 of the remote sub-system 102. It is contemplated that in some embodiments, some of the steps provided below are performed by one or more of the on-board computers of the vehicles 104.

The method 800 begins 801 and flow proceeds to step 802, whereat a particular vehicle 104 or the remote sub-system 102 determines whether the particular vehicle 104 has received particular content. If the vehicle 104 has received the content, then the method may 800 end, or repeat regarding other content. At step 804, the vehicle 104 or remote sub-system 102 determines whether the vehicle has reached a defined transition point 602, as described above. If the vehicle 104 has not passed a transition point 602, flow proceeds back to step 802 for re-consideration of whether the content has been received.

If at step 804, it is determined that the vehicle 104 has passed a relevant transition point 602, then flow proceeds to step 806, whereat a long-range communication is initiated for delivering the content directly to the vehicle 104. As provided above, following seeding of the content to the vehicle 104, the vehicle may at step 808 disseminate the content to other vehicles 104 that the particular vehicle encounters in the system 100, such as for a certain amount of time following the seeding. In some embodiments, the vehicle 104 determines whether to disseminate the content according to considerations described herein, such as in connection with desired characteristics for data diversity in the system 100. The method 800 may end 809.

C. Dissemination Scheme for Increased Data Diversity

In one contemplated embodiment, the remote sub-system 102 or at least one vehicle 104 initiates one or more long-range communications for transfer of particular content in response to determining that increased diversity of data is desired within the system 100.

According to the encounter-based fetch and share scheme, vehicles 104 collaborate to perform an efficient acquisition of data in response to a determination that a desired level or threshold of data diversity has not been reached. Vehicles 104 or the remote sub-system 102 determines that the threshold has not been reached by results of inquiries and/or data sharing of information during encounters between vehicles 104. During each encounter, vehicles perform an exchange of index information in order to determine unique content that is available from the other communicating vehicle. This inquiry prevents vehicles from wasting bandwidth through the exchange of content that already exists on the other vehicle. This inquiry can be formulated in terms of a nested database query in which the result set from one vehicle is compared against the result set of another vehicle. These operations can be used to identify the unique data content from each vehicle's perspective.

In one embodiment, a particular vehicle 104 or the remote sub-system 102 considers a diversity index to determine that data diversity is low, such as the following diversity index:

$$D = 1 - \sum_{i=1}^{N} p_i^2,$$

p is a proportion of content in a category, and N is a number of categories. The vehicle 104 and/or the remote sub-system 102 is programmed such that if D is less than a pre-determined threshold (or greater than a pre-determined threshold, depending on the format of the index), the vehicle 104 obtains, or the remote sub-system 102 automatically provides new content by dividing data access task across n vehicles. The new content may include content that has not previously been introduced to the system 100 and/or content that has already been introduced, but by other channels, such as through seeding to different vehicles 104. The new content could also include a different (e.g., updated) version of previously distributed content. Index exchanges described above are used in the characterization of the level of data diversity in the system. If a large number of encounters result in few information exchanges (due to a high degree of duplicate data), a low data diversity level will trigger the system to fetch new content from the infrastructure provider. Regarding diversity index, reference is made to *Urbanization, Technology, and the Division of Labor* (1962), American Sociological Review 27: 667-677, by Gibbs, Jack P., and Martin, William T.

In some embodiments, the remote sub-system 102 determines the vehicles 104 and/or an amount (e.g., number of percentage) of vehicles 104 that have received particular content. The remote sub-system 102 may accomplish this task by, for example, evaluating indications of the vehicles 104 or amount of vehicles 104 receiving the content. For example, vehicles receiving the content may send a receipt-confirmation message to the remote system 102.

Figure 9:
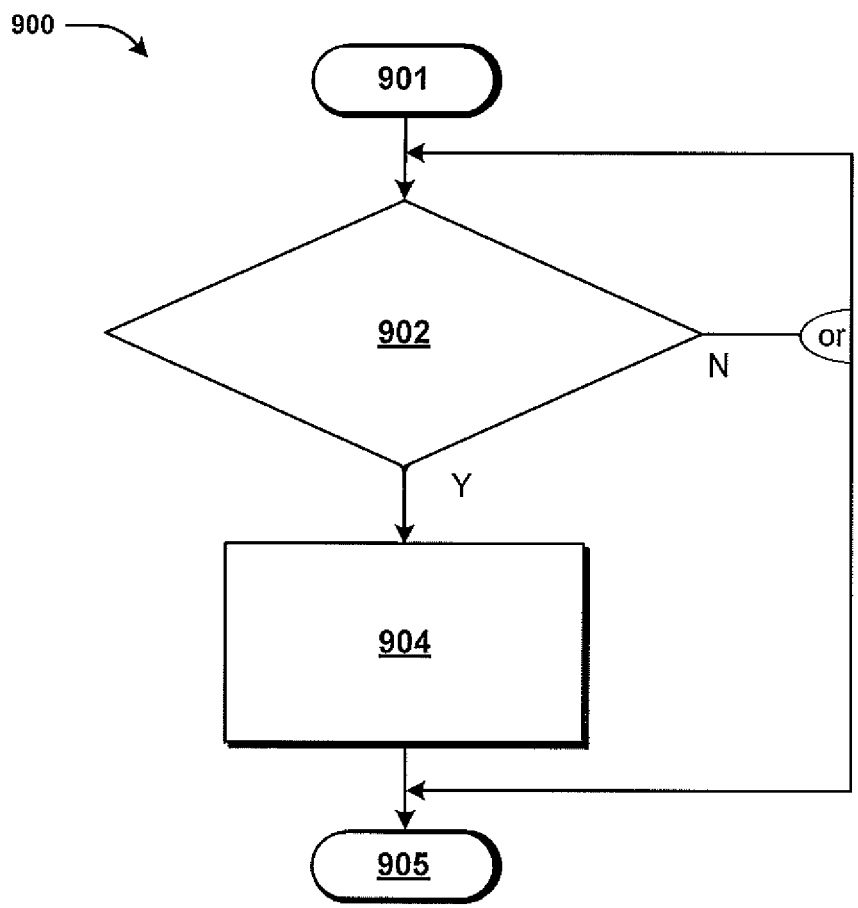
FIG. 9 shows a method for diversifying data in an intelligent information dissemination system.

FIG. 9 shows an exemplary method 900 for diversifying data in an intelligent information dissemination system 100. It should be understood that the steps of the method 900 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 900 can be ended at any time. In certain embodiments, some or all steps of this process, and/or substantially equivalent steps are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with the processor of the central server 110 of the remote sub-system 102. It is contemplated that in some embodiments, some of the steps provided below are performed by one or more of the on-board computers of the vehicles 104.

The method 900 begins 901 and flow proceeds to step 902, whereat a considered of whether a data-diversity index, such as that described above, is beyond a predetermined threshold is performed. As provided, this consideration may be performed by the remote sub-system 102 or by the vehicle 104, itself.

If it is determined at step 902 that diversity index is not beyond the threshold, flow may proceed back to the beginning for re-consideration of whether the index is beyond the threshold, or the method 900 may be configured to end at this point, as shown in FIG. 9.

If at step 902, it is determined that the vehicle 104 has passed a relevant transition point, then flow proceeds to step 904, whereat new content is provided to the vehicles 104 in the system, in response to vehicle 104 request or automatically by remote sub-system 102. The new content is provided by dividing data access task across n vehicles. The diversity result can be made individually using, for example, a pro-pose-and-accept mechanism with other vehicles, or made by consensus, such as by averaging the diversity indices of individual vehicles.

As provided above, the new content may be content that has not previously been introduced to the system 100, content that has already been introduced, but by other channels (e.g., by way of different vehicles 104), or a different (e.g., updated) version of previously distributed content. The method 900 may end 905.

D. Encounter-Based Inter-Vehicle Data Exchange

In some embodiments, vehicles 104 exchange index information identifying indices, or pieces of data, present in each vehicle. By this exchange, a particular vehicle 104 encountering another vehicle can identify content that the encountered vehicle has that the particular vehicle 104 does not have. The particular vehicle 104 can request any such content automatically, or first determine whether the particular vehicle 104 needs or would like to have the content before requesting it.

In some embodiments, the vehicle 104 having the content that the other vehicle 104 does not have determines that it has content that the other vehicle 104 does not have, and automatically sends the content to the other vehicle 104 or advises the other vehicle 104 that it has content that the other vehicle 104 does not have. The other vehicle 104 can then reply requesting the content.

In many implementations, the vehicles 104 exchange content. In this way, both vehicles 104 leave the encounter having content from the other. For example, both vehicles 104 can leave the encounter having both content A, which was originally only with a first vehicle of the two, and content B, which was originally only with a second vehicle of the two. Even if only one of the vehicles receives information from the other vehicle that it previously did not have, data diversity and data throughput in the system 100 are enhanced.

The vehicles 104 may be programmed to share information in response to a variety of determinations without departing from the scope of the present invention. For instance, a vehicle 104 can be programmed to automatically request or provide particular content upon determining that the vehicle 104 does not have the particular content or that the other vehicle does not have the particular content, respectively.

Figure 10:
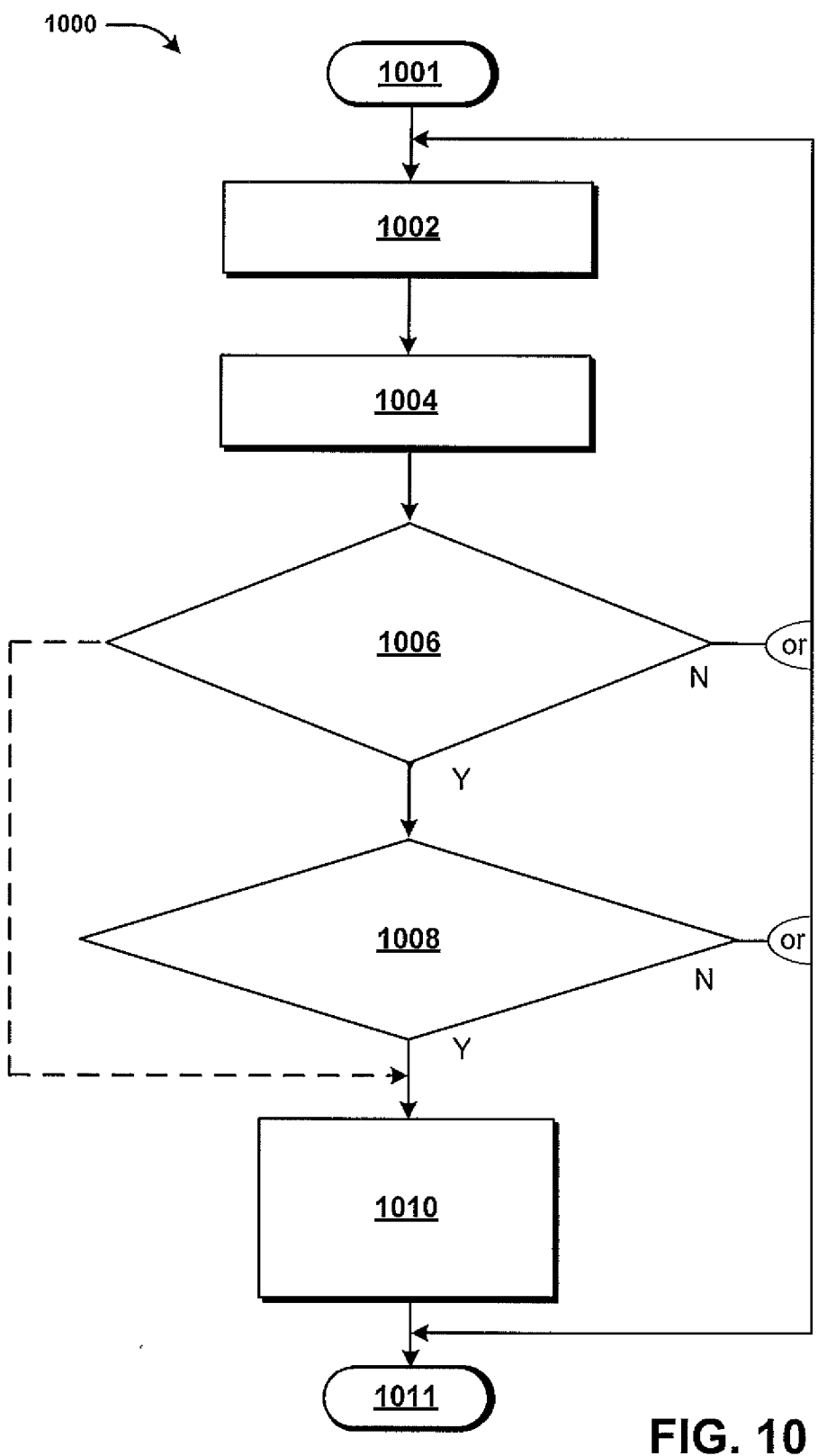
FIG. 10 shows a method for inter-vehicle sharing of content based on shared index information, according to one embodiment of the present disclosure.

FIG. 10 shows an exemplary method 1000 for the inter-vehicle sharing of information based on shared index information, according to one embodiment of the present disclosure. It should be understood that the steps of the method 1000 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 1000 can be ended at any time. In certain embodiments, some or all steps of this process, and/or substantially equivalent steps are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory of the on-board computers of the vehicles 104.

The method 1000 begins 1001 and flow proceeds to step 1002, whereat vehicles 104a/b encounter one another (the references a and b are used for explanatory purposes here, and are not shown particularly in the figures). At step 1004, the vehicles 104a/b communicate via short-range communications and exchange index information indicating respective content possessed by the vehicles 104.

At step 1006, at least one of the vehicles 104a determines whether the other vehicle 104b has content that the vehicle 104a does not have. If at step 1006, the vehicle 104a determines that the other vehicle 104b does have not content that the vehicle 104a does not have, or the vehicle 104a determines that the other vehicle 104b does not have content that it does not have, the method 1000 may be repeated, such as regarding other content, or the method 1000 may end with respect to this encounter between the two vehicles 104a/b, as shown in FIG. 10.

If at step 1006, the vehicle 104a determines that the other vehicle 104b has content that the vehicle 104a does not have, or that it has content that the other vehicle 104b does not have, the vehicle 104a in some embodiments determines at a step 1008 whether the vehicle 104a/b not having the content needs or wants the content. The need or want may be established by a preference pre-selected by an operator of the vehicle 104a/b, established in the on-board computer of the vehicle 104a/b, communicated in the content, itself, or in other ways.

In one embodiment, the vehicle 104b having the information that the other vehicle 104a does not have determines at step 1006 that the vehicle 104b has information that the other vehicle does not have, and flow proceeds (as indicated by dashed line in FIG. 10) to step 1010 whereat the vehicle 104b automatically transmits the content to the first vehicle 104a. As noted, the vehicle 104b can transmit an inquiry or notification to vehicle 104a regarding the content, in response to which vehicle 104a responds with a message indicating desire for the content.

If at step 1008, the vehicle 104a determines that it does not need and/or does not want the content that it does not have, then the method 1000 may be repeated, such as regarding other content and/or from the perspective of the other vehicle 104b, if not already performed, or the method 1000 may end with respect to the vehicles 104a/b.

If at step 1008, the vehicle 104a determines that it does need or want the content that vehicle 104b has, and it does not have, then the vehicle 104a, at step 1010, procures the content. The vehicle 104a may procure the content by, for example, sending a request message to the other vehicle 104b requesting the content. The method 1000 may end 1011.

X. Conclusion

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system for intelligent dissemination of a seed message to a network of vehicles via long-range communication to a select delegate vehicle, and short-range communications from the delegate vehicle, the system comprising:
   a processor; and
   a memory storing a delegation and dissemination algorithm that, when executed by the processor, causes the processor to:
      select at least one delegate vehicle, of the network of vehicles, the delegate vehicle being selected to receive and re-transmit to the network of vehicles, via short-range communications, the seed message; and
      seed the message into the network of vehicles by transmitting the message to each delegate vehicle selected via long-range communications for use by the delegate vehicles to transmit the message, via short-range communications, to other vehicles of the network of vehicles.

2. The system of claim 1 wherein the delegation and dissemination algorithm causes the processor to:
   define a dissemination area; and
   define multiple delegation zones within the dissemination area;
   wherein, in causing the processor to select at least one delegate vehicle, of the network of vehicles, the delegation and dissemination algorithm causes the processor to select at least one delegate vehicle, of the network of vehicles, for each delegation zone.

3. The system of claim 2, wherein the instructions, in causing the processor to identify at least one delegate vehicle for each delegation zone, considers at least one variable selected from a group of variables consisting of:
   a Degree of Contacting, being a number of vehicles that a given vehicle can contact in one hop;
   a Degree of Facilitating, being a number of vehicles that the given vehicle can contact in multiple hops;
   location of vehicles; and
   direction of travel of vehicles.

4. The system of claim 2, wherein the instructions, in causing the processor to identify at least one delegate vehicle for each delegation zone, considers whether to identify more than one delegate vehicle for each delegation zone, including considering of a cost for having more delegate vehicles and a threshold for latency for the message.

5. The system of claim 4, wherein the instructions, in causing the processor to consider whether to identify more than one delegate vehicle for each delegation zone, including consideration of the cost for having more delegate vehicles and the threshold for latency for the message, considers cost including one or more of: system resource usage, long-range network resource usage, and monetary cost of long-range communications.

6. The system of claim 1, wherein:
the long-range communications are performed via a cellular communications network; and
the short-range communications are performed via at least one of: dedicated short-range communications (DSRC), WI-FI, BLUETOOTH, infrared, infrared data association (IRDA), and near field communications (NFC).

7. A method, for intelligent dissemination of a seed message to a network of vehicles via long-range communication to a select delegate vehicle, and short-range communications from the delegate vehicle, the method comprising:
identifying, by a central server using a computer processor, at least one delegate vehicle, of the network of vehicles the delegate vehicle being selected to receive and re-transmit to the network of vehicles, via short-range communications, the seed message; and
seeding, by the central server using the processor, the message into the network of vehicles by transmitting the message to each delegate vehicle selected via long-range communications for use by the delegate vehicles to transmit the message, via short-range communications, to other vehicles of the network of vehicles.

8. The method of claim 7, further comprising:
defining, by the central server, a dissemination area; and
defining, by the central server, multiple delegation zones within the dissemination area;
wherein the central server, in identifying at least one delegate vehicle, of the network of vehicles, identifies at least one delegate vehicle for each defined delegation zone.

9. The method of claim 8, wherein in identifying at least one delegate vehicle for each delegation zone, the central server considers at least one variable selected from a group of variables consisting of:
a Degree of Contacting, being a number of vehicles that a given vehicle can contact in one hop;
a Degree of Facilitating, being a number of vehicles that the given vehicle can contact in multiple hops;
location of vehicles; and
direction of travel of vehicles.

10. The method of claim 8, wherein, in identifying the at least one delegate vehicle for each delegation zone, the central server considers whether to identify more than one delegate vehicle for each delegation zone, including consideration of a cost for having more delegate vehicles and a threshold for latency for the message.

11. The method of claim 10, wherein, in considering whether to identify more than one delegate vehicle for each delegation zone, including consideration of the cost for having more delegate vehicles and the threshold for latency for the message, the central server considers cost including one or more of: system resource usage, long-range network resource usage, and monetary cost of long-range communications.

12. The method of claim 8, further comprising propagating, by the delegate vehicles, the seed message throughout respective zones of the delegation zones.

13. The method of claim 12, wherein the delegate vehicle continues to propagate the message until one of the following:
a delegation assignment to the delegate vehicle is migrated to another vehicle;
a time for propagating the message has expired; and
a number of broadcasts of the message has been reached.

14. The method of claim 7, wherein:
the seeding is performed using a cellular communications network; and
the short-range communications are performed via at least one of:
dedicated short-range communications (DSRC), WI-FI, BLUETOOTH, infrared, infrared data association (IRDA), and near field communications (NFC).

15. A method, for migrating delegation assignment from a first, delegate vehicle to a second, non-delegate vehicle in an intelligent system for disseminating messages via a long-range communications to select delegate vehicles, and via short-range communications from the delegate vehicles, the method comprising:
comparing, by a system using a computer processor, a Degree of Contacting for the first, delegate vehicle to a Degree of Contacting for the second, non-delegate vehicle, wherein the Degree of Contacting is a number of vehicles that a given vehicle can contact in one hop;
comparing, by the system, if the Degree of Contacting for the first, delegate vehicle is equal to or less than the Degree of Contacting for the second, non-delegate vehicle, a Degree of Facilitating for the first, delegate vehicle to a Degree of Facilitating for the second, non-delegate vehicle, wherein the Degree of Facilitating is a number of vehicles that a given vehicle can contact in multiple hops; and
calculating, by the system, if the Degree of Facilitating for the first, delegate vehicle is equal to or less than the Degree of Facilitating for the second, non-delegate vehicle, a Degree of Similarity between the first, delegate vehicle and the second, non-delegate vehicle;
wherein:
if the Degree of Similarity is greater than a predetermined threshold, the first, delegate vehicle maintains its delegate role; and
if the Degree of Similarity is less than or equal to the predetermined threshold, the second vehicle assumes the delegate role previously held by the first vehicle.

16. The method of claim 15, further comprising propagating, by the second vehicle, the message in its new delegate role.

17. The method of claim 16, wherein the second vehicle, in its new delegate role, continues to propagate the message until one of the following:
a delegation assignment to the delegate vehicle is migrated to another vehicle;
a time for propagating the message has expired; and
a number of broadcasts of the message has been reached.

18. The method of claim 15, wherein:
each vehicle includes an on-board computer; and
the method is performed by at least one of:
the on-board computer of the first vehicle;
the on-board computer of the second vehicle; and
the central server.

19. The method of claim 15, wherein:
if the Degree of Contacting for the first, delegate vehicle is higher than the Degree of Contacting for the second, non-delegate vehicle:
the first, delegate vehicle maintains its delegate role.

20. The method of claim 15, wherein:
if the Degree of Facilitating for the first, delegate vehicle is higher than the Degree of Facilitating for the second, non-delegate vehicle:
the first, delegate vehicle maintains its delegate role.

21. A method, for intelligent dissemination of messages by way of short-range communications and long-range communications to vehicles in a system including a central server, comprising:
  determining, by a system using a computer processor, whether at least one particular vehicle of the vehicles in the system has received a particular message by way of short-range communications from another one of the vehicles in the system;
  determining whether a time-based trigger or a geographic-based trigger has occurred with respect to the particular vehicle of the system;
  establishing, in response to determining that the particular vehicle has not received the particular message by way of short-range communications from the other vehicles and determining that at least one of the time-based trigger and the geographic-based trigger has occurred, a long-range communication between the particular vehicle and the central server; and
  providing the particular message to the particular vehicle by way of the long-range communication established.

22. The method of claim 21, wherein the system includes the central server.

23. The method of claim 21, wherein the system includes the particular vehicle.

24. The method of claim 21, further comprising the particular vehicle sharing the particular message by short-range communications with other vehicles in the system with which the particular vehicle encounters following receipt by the particular vehicle of the particular message from the central server by way of the long-range communication.

25. The method of claim 21, wherein the time-based trigger includes a time deadline.

26. The method of claim 25, wherein the time deadline includes an elapsed time since a time of initial content transmission of the particular message from the central server.

27. The method of claim 25, wherein the time deadline includes a time since a date of last call corresponding to the particular message.

28. The method of claim 25, wherein the time deadline includes a storage expiration time or a cache expiration time.

29. The method of claim 21, wherein at least one of the time-based trigger and the geographic-based trigger is established by an operator of the particular vehicle.

30. The method of claim 21, further comprising adjusting at least one of the time-based trigger and the geographic-based trigger based on information-dissemination activities in the system.

31. The method of claim 30, wherein adjusting at least one of the time-based trigger and the geographic-based trigger based on information-dissemination activities in the system includes adjusting at least one of the time-based trigger and the geographic-based trigger based at least in part on communication patterns related to the particular vehicle.

32. A method, for increasing data diversity in an intelligent data dissemination system using short-range communications and long-range communications to vehicles in the system including a central server, comprising:
  determining, in a determining operation, whether a data diversity index is beyond a pre-determined threshold value; and
  providing, in response to determining that the data diversity index has been exceeded, new content to at least one of the vehicles in the system by way of long-range communication.

33. The method of claim 32, wherein the central server performs the determining operation.

34. The method of claim 32, wherein the data diversity index is applied as:

$$D = 1 - \sum_{i=1}^{N} p_i^2,$$

where p is a proportion of content in a category and N is a number of categories.

35. A method, for increasing data diversity in an intelligent data dissemination system using short-range communications and long-range communications to vehicles in the system, comprising:
  vehicles encountering each other in the system and establishing short-range communication between them;
  each of the encountering vehicles providing, by way of short-range communication, index information to the other vehicle indicating content possessed by the vehicle;
  determining, based on the index information received by the short-range communication, that one of the vehicles has certain content that the other vehicle does not have, in a determining operation;
  providing, in response at least in part to the determining operation, by the vehicle having the certain content, which the other vehicle does not have, by way of the short-range communication, the certain content to the vehicle not having the certain content; and
  receiving, by the vehicle not previously having the certain content, the certain content from the other vehicle by way of the short-range communication.

36. The method of claim 35, wherein:
  the vehicle having the certain content that the other vehicle does not have determines that the other vehicle does not have the certain content; and
  in response to the determining that the other vehicle does not have the certain content that the vehicle has, the vehicle:
    automatically providing the certain content to the other vehicle by way of short-range communications; or
    transmitting an inquiry or notification to the other vehicle regarding the certain content by way of short-range communications.

37. The method of claim 35, wherein:
  the vehicle not having the certain content determines that the other vehicle has the certain content that it does not have;
  the vehicle not having the certain content, in response to determining that it does not having the certain content of the other vehicle, transmits a request message by way of short-range communications to the vehicle having the certain content, requesting the certain content; and
  the vehicle having the content provides the certain content to the vehicle not previously having the certain content in response to the request message.

38. The method of claim 35, wherein the vehicles exchange content so that each vehicle leaves the encounter having data that it did not previously have.

39. The method of claim 38, wherein the vehicles exchange content so that each have the same set, or sub-set, of content following the encounter the encounter.

40. The method of claim 38, wherein each of the vehicles received its respective content, which the other vehicle does not initially possess, by way of long-range communications.

* * * * *